US010982297B2

(12) United States Patent
Ono et al.

(10) Patent No.: US 10,982,297 B2
(45) Date of Patent: Apr. 20, 2021

(54) STEEL SHEET AND METHOD FOR PRODUCING THE SAME

(71) Applicant: JFE STEEL CORPORATION, Tokyo (JP)

(72) Inventors: Yoshihiko Ono, Tokyo (JP); Shimpei Yoshioka, Tokyo (JP); Nobuyuki Nakamura, Tokyo (JP); Hiroshi Hasegawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 16/329,672

(22) PCT Filed: Sep. 28, 2017

(86) PCT No.: PCT/JP2017/035199
§ 371 (c)(1),
(2) Date: Feb. 28, 2019

(87) PCT Pub. No.: WO2018/062380
PCT Pub. Date: Apr. 5, 2018

(65) Prior Publication Data
US 2019/0194775 A1    Jun. 27, 2019

(30) Foreign Application Priority Data
Sep. 28, 2016  (JP) .............................. JP2016-189896

(51) Int. Cl.
*C23C 2/06* (2006.01)
*C23C 2/40* (2006.01)
(Continued)

(52) U.S. Cl.
CPC ................ *C21D 9/46* (2013.01); *B32B 15/01* (2013.01); *B32B 15/013* (2013.01); *B32B 15/04* (2013.01); *B32B 15/043* (2013.01); *B32B 15/18* (2013.01); *C21D 6/004* (2013.01); *C21D 6/005* (2013.01); *C21D 6/008* (2013.01); *C21D 8/021* (2013.01); *C21D 8/0205* (2013.01); *C21D 8/0236* (2013.01); *C21D 8/0247* (2013.01); *C21D 8/041* (2013.01); *C21D 8/0405* (2013.01); *C21D 8/0426* (2013.01); *C21D 8/0436* (2013.01); *C21D 8/0473* (2013.01); *C21D 9/52* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01);
(Continued)

(58) Field of Classification Search
CPC ......... C22C 38/08; C22C 38/16; C22C 38/60; C22C 38/14; C22C 38/005; C22C 38/12; C22C 38/04; C22C 38/001; C22C 38/44; C22C 38/002; C22C 38/008; C22C 38/02; C22C 38/06; C22C 38/42; C22C 38/46; C22C 38/48; C22C 38/50; C22C 38/54; C22C 38/58; C22C 38/18; C22C 38/20; C22C 38/22; C22C 38/24; C22C 38/26; C22C 38/28; C22C 38/32; C22C 38/40; B32B 15/013; B32B 15/01; B32B 15/04; B32B 15/043; B32B 15/18; C23C 2/06; C23C 2/40; C23C 30/00; C23C 30/005; C23C 28/3225; C23C 28/025; Y10T 428/12757; Y10T 428/12799; Y10T 428/12951; Y10T 428/12972; C21D 8/041; C21D 8/021; C21D 8/0426; C21D 8/0405; C21D 8/0436; C21D 8/0473; C21D 8/0236; C21D 8/0247; C21D 8/0205; C21D 9/46; C21D 9/52; C21D 6/004; C21D 6/005; C21D 6/008; C21D 2211/008; C21D 2211/002
See application file for complete search history.

(56) References Cited

U.S. PATENT DOCUMENTS

2018/0100212 A1*  4/2018  Ono .................... C21D 9/46
2019/0203317 A1*  7/2019  Yoshioka .............. C21D 1/18

FOREIGN PATENT DOCUMENTS

CN        1990894 A    7/2007
CN      105861926 A    8/2016
(Continued)

OTHER PUBLICATIONS

Machine Translation, Masataka et al., JP 2011-202195, Oct. 2011. (Year: 2011).*
Aug. 19, 2020 Office Action issued in Korean Patent Application No. 10-2019-7005705.
(Continued)

*Primary Examiner* — Michael E. La Villa
(74) *Attorney, Agent, or Firm* — Oliff PLC

(57) ABSTRACT

A steel sheet having a specified chemical composition and a method for producing the steel sheet. The steel sheet has a microstructure including martensite and bainite. The total area fraction of the martensite and the bainite to the entirety of the microstructure is more than 90% and 100% or less. The microstructure includes inclusion clusters A and B, the content of the clusters A in the microstructure being 2 clusters/mm$^2$ or less, and the content of the clusters B in the microstructure being 5 clusters/mm$^2$ or less. The microstructure includes carbide particles including Fe as a main constituent which have an aspect ratio of 2.0 or less and a major axis of 0.30 μm or more and 2 μm or less. The content of the carbide particles in the microstructure is 4000 particles/mm$^2$ or less. The microstructure includes prior γ grains having an average size of 6 to 15 μm.

28 Claims, No Drawings

(51) Int. Cl.

| | |
|---|---|
| *C22C 38/58* | (2006.01) |
| *C22C 38/54* | (2006.01) |
| *C22C 38/50* | (2006.01) |
| *C22C 38/48* | (2006.01) |
| *C22C 38/42* | (2006.01) |
| *C22C 38/46* | (2006.01) |
| *C22C 38/06* | (2006.01) |
| *C22C 38/02* | (2006.01) |
| *C22C 38/00* | (2006.01) |
| *C22C 38/44* | (2006.01) |
| *B32B 15/01* | (2006.01) |
| *C21D 8/02* | (2006.01) |
| *C21D 9/46* | (2006.01) |
| *C21D 6/00* | (2006.01) |
| *C22C 38/08* | (2006.01) |
| *C22C 38/16* | (2006.01) |
| *C21D 8/04* | (2006.01) |
| *C22C 38/60* | (2006.01) |
| *C22C 38/14* | (2006.01) |
| *C22C 38/12* | (2006.01) |
| *C22C 38/04* | (2006.01) |
| *C21D 9/52* | (2006.01) |
| *C22C 38/40* | (2006.01) |
| *C22C 38/18* | (2006.01) |
| *B32B 15/04* | (2006.01) |
| *C22C 38/28* | (2006.01) |
| *C22C 38/32* | (2006.01) |
| *C22C 38/22* | (2006.01) |
| *C23C 30/00* | (2006.01) |
| *C23C 28/00* | (2006.01) |
| *B32B 15/18* | (2006.01) |
| *C22C 38/20* | (2006.01) |
| *C22C 38/24* | (2006.01) |
| *C22C 38/26* | (2006.01) |
| *C23C 28/02* | (2006.01) |

(52) U.S. Cl.
CPC .............. *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C23C 2/06* (2013.01); *C23C 2/40* (2013.01); *C23C 28/025* (2013.01); *C23C 28/3225* (2013.01); *C23C 30/00* (2013.01); *C23C 30/005* (2013.01); *C21D 2211/002* (2013.01); *C21D 2211/008* (2013.01); *Y10T 428/12757* (2015.01); *Y10T 428/12799* (2015.01); *Y10T 428/12951* (2015.01); *Y10T 428/12972* (2015.01)

(56) References Cited

FOREIGN PATENT DOCUMENTS

| | | |
|---|---|---|
| EP | 3128026 A1 | 2/2017 |
| JP | S54-31019 U | 3/1979 |
| JP | S5-52785 A | 1/1980 |
| JP | 3514276 B2 | 3/2004 |
| JP | 2008-214645 A | 9/2008 |
| JP | 4427010 B2 | 3/2010 |
| JP | 2011-202195 A | 10/2011 |
| JP | 2011-202207 A | 10/2011 |
| JP | 2013-213242 A | 10/2013 |
| JP | 5428705 B2 | 2/2014 |
| JP | 2014-196557 A | 10/2014 |
| JP | 5896085 B1 | 3/2016 |
| JP | 2016-050343 A | 4/2016 |
| WO | 2016/111271 A1 | 7/2016 |
| WO | 2016/120914 A1 | 8/2016 |
| WO | WO 2016/152163 * | 9/2016 |

OTHER PUBLICATIONS

Dec. 19, 2017 International Search Report issued in International Patent Application No. PCT/JP2017/035199.
May 8, 2020 Office Action issued in Chinese Patent Application No. 201780053038.7.
Apr. 18, 2019 Extended Search Report issued in European Patent Application No. 17856329.2.

* cited by examiner

STEEL SHEET AND METHOD FOR PRODUCING THE SAME

TECHNICAL FIELD

This application relates to a steel sheet and a method for producing the steel sheet and particularly to a steel sheet suitable for the production of components of automobiles, electrical household appliances, and the like which are formed into shape by cold pressing.

BACKGROUND

With an increasing demand for reductions in the weights of automotive bodies, the application of high-strength steel sheets having a TS of 1320 to 1470 MPa to vehicle frame components, such as center pillar R/F (reinforcement), bumpers, impact beams, and the like (hereinafter, the above articles are referred to also as "components"), is becoming popular. In order to further reduce the weight of automotive bodies, studies of application of steel sheets having a TS of about 1800 MPa (about 1.8 GPa) and steel sheets having a TS of more than 1800 MPa are being conducted.

There have been extensive studies of application of high-strength steel sheets in which the steel sheets are formed into shape by being pressed at high temperatures, that is, hot-pressed into shape. On the other hand, the application of high-strength steel sheets in which the steel sheets are cold-pressed into shape is being reconsidered from the viewpoints of cost and productivity.

However, in the case where a high-strength steel sheet having a TS of about 1320 MPa or more is formed into a component by cold pressing, the steel sheet may undergo delayed fracture as a result of an increase in the residual stress inside the component and degradation in the delayed fracture resistance.

Delayed fracture is a phenomenon where, when a component is placed under a hydrogen-penetrating environment while a high stress is applied to the component, hydrogen that enters a steel sheet constituting the component reduces the interatomic bonding forces and causes local deformation, which leads to formation of microcracks, and the component is fractured as a result of the propagation of the microcracks.

As a technique for improving resistance to the delayed fracture described above, for example, Patent Literature 1 discloses a technique in which delayed fracture resistance is improved by achieving a composition containing, by mass, C: 0.08% to 0.18%, Si: 1% or less, Mn: 1.2% to 1.8%, P: 0.03% or less, S: 0.01% or less, sol. Al: 0.01% to 0.1%, N: 0.005% or less, O: 0.005% or less, B: 5 to 25 ppm, and one or more of Nb: 0.005% to 0.04%, Ti: 0.005% to 0.04%, and Zr: 0.005% to 0.04%, by satisfying the following relationship between Ceq and TS: TS≥2270×Ceq+260 and Ceq≤0.5, where Ceq=C+Si/24+Mn/6, and by adjusting the volume fraction of martensite in the microstructure (steel microstructure) to be 80% or more.

Patent Literatures 2, 3, and 4 disclose techniques in which resistance to hydrogen-induced cracking is reduced by reducing the S content in steel to a predetermined level and adding Ca to the steel.

Patent Literature 5 discloses a technique in which delayed fracture resistance is improved by achieving a composition containing C: 0.1% to 0.5%, Si: 0.10% to 2%, Mn: 0.44% to 3%, N≤0.008%, Al: 0.005% to 0.1%, and one or more of V: 0.05% to 2.82%, Mo: 0.1% or more and less than 3.0%, Ti: 0.03% to 1.24%, and Nb: 0.05% to 0.95% and dispersing fine alloy carbide particles, which serve as hydrogen-trapping sites, in the steel.

CITATION LIST

Patent Literature

PTL 1: Japanese Patent No. 3514276
PTL 2: Japanese Patent No. 5428705
PTL 3: Japanese Unexamined Patent Application Publication No. 54-31019
PTL 4: Japanese Unexamined Patent Application Publication No. 2013-213242
PTL 5: Japanese Patent No. 4427010

SUMMARY

Technical Problem

Delayed fracture, which is described above, of actual components produced by press forming occurs primarily at the end surfaces of a steel sheet cut by shearing or punching (hereinafter, such end surfaces of the steel sheet are referred to also as "sheared end surfaces"). This is presumably because a sheared end surface includes a zone in which the fracture limit strain has been reached (hereinafter, such a zone is referred to also as "strain-affected zone") and a part of the sheared end surface which is in the vicinity of the strain-affected zone is considerably work-hardened (i.e., the proportionality limit has been increased), which results in an increase in the tensile stress that remains after the subsequent press forming process. In fact, the critical delayed fracture stress of a steel sheet having untreated sheared end surfaces is about ⅓ to 1/20 the critical delayed fracture stress of a steel sheet having sheared end surfaces from which the strain-affected zone has been removed by reaming. That is, it is considered that delayed fracture resistance that may occur at the sheared end surfaces (hereinafter, referred to also as "delayed fracture resistance at sheared end surfaces") is one of the principal factors that determine the resistance of an actual component to delayed fracture.

However, in all of the techniques disclosed in Patent Literatures 1 to 5, attempt is made to improve the resistance of a steel sheet to delayed fracture; the presence of the strain-affected zone in the sheared end surfaces is not considered sufficiently. Therefore, it cannot be said that steel sheets produced in accordance with the techniques disclosed in Patent Literatures 1 to 5 have sufficiently high delayed fracture resistance at sheared end surfaces.

In addition, Patent Literatures 2 to 4 are originally directed to "thick steel sheets" having a thickness of 10 mm or more but not to "thin steel sheets", which are formed into automotive components and the like. The thick steel sheets and the thin steel sheets greatly differ from each other in terms of thickness, cumulative rolling reduction through the production process, microstructure (steel microstructure), steel strength, and the degree of press processing.

The disclosed embodiments were made in light of the current situation described above. An object of the disclosed embodiments is to provide a steel sheet having a thickness of 0.5 to 2.6 mm and a high tensile strength (TS) of 1320 MPa or more. The steel sheet has excellent delayed fracture resistance. In particular, the steel sheet has excellent delayed fracture resistance at sheared end surfaces. More specifically, the steel sheet enables a component produced by blanking the steel sheet by shearing or slitting or drilling holes in the steel sheet by punching and subsequently cold-pressing the steel sheet or by cold-pressing the steel sheet and cutting the resulting component by shearing or drilling holes in the component by punching to have excellent delayed fracture resistance. Another object of the disclosed embodiments is to provide an advantageous method for producing the steel sheet.

Solution to Problem

The inventors conducted extensive studies in order to address the above issues and, consequently, found the following facts.

i) The delayed fracture resistance at sheared end surfaces varies in accordance with the degree of damage of the sheared end surfaces (the degree of hardening of the surface layer and the residual stress inside the surface layer) and the likelihood of cracks propagating toward the inside. In particular, in a high-strength steel sheet having a TS of about 1320 MPa or more, significantly large inclusion clusters having a major axis of 100 μm or more (inclusion clusters A) locally increase the strain and residual stress inside the sheared end surfaces, serve as delayed fracture origins and paths through which delayed fracture propagates, and degrade the properties of the steel sheet.

The inclusion clusters A are composed primarily of MnS, $Al_2O_3$, and (Al, Ca)—O and present in a large amount around the center of the steel sheet in the thickness direction. Therefore, it is not sufficient to treat only the surface layer; it is necessary to reduce the amount of the inclusion clusters A present even around the center of the steel sheet in the thickness direction. In particular, in a thin steel sheet having a thickness of 0.5 to 2.6 mm, a large amount of inclusion clusters A that extend 300 μm or more in a dotted-line manner may be present in the Mn center-segregation zone formed at the center of the steel sheet in the thickness direction. This induces significant negative impacts on delayed fracture. Accordingly, it is important to reduce the amount of the inclusion clusters A. The amount of inclusion clusters A can be reduced by minimizing the Mn content and reducing the S content to be less than 10 ppm by mass at least and preferably to be 6 ppm by mass or less.

ii) Addition of trace amounts of Nb and Ti remarkably improves delayed fracture resistance. However, it was confirmed that a steel having a C content of 0.13% or more may have significantly low delayed fracture resistance in the case where the amounts of the above elements added to the steel are large or the above elements are added to the steel in combination. A steel having a C content of 0.13% or more includes relatively large inclusion clusters having a major axis of 20 μm or more and less than 100 μm (inclusion clusters B). The inclusion clusters B are considered to cause negative impacts, similarly to the inclusion clusters A. The inclusion clusters B are composed of Nb(C,N), (Nb, Ti) (C,N), and Ti(C,S) that are distributed in clusters and MnS precipitated as composite inclusions with the above substances serving as nuclei. When the Mn content is 1.8% or more, microsegregation and macrosegregation of Mn occurs in a certain amount and the above substances are likely to be formed as composite precipitates at the segregation sites. Consequently, combined with the negative impacts of segregation of Mn and the composite precipitation of MnS, the negative impacts of the inclusion clusters B may be significantly increased compared with the case where only Nb(C, N), (Nb, Ti) (C,N), and Ti(C,S) are precipitated.

In order to address the above issues, the contents of Nb and Ti are controlled to be within specific ranges, the temperature at which a slab is heated and the amount of time during which the slab is heated are controlled strictly, and the contents of N and S are minimized. This reduces the negative impacts of the inclusions and remarkably increases delayed fracture resistance even in the case where steel includes Nb and Ti. The resistance of a steel sheet that includes Nb and Ti to delayed fracture may be improved by annealing the steel sheet at a high temperature in a continuous annealing process, such as a CAL or a CGL, in order to grow γ grains.

iii) The delayed fracture resistance may be significantly improved by solute B being retained in the steel. However, in contrast to the thick steel sheets disclosed in Patent Literatures 2 to 4 above, in a cold-rolled steel sheet produced by performing annealing subsequent to cold rolling and, in particular, in a steel in which solute B remains, carbide particles including Fe as a main constituent, such as cementite particles, may aggregate with one another to form coarse particles during annealing and some of the coarse particles may remain undissolved in the steel, which cause negative impacts in terms of delayed fracture at the sheared end surfaces. Accordingly, it is also important to reduce the amount of such carbides including Fe as a main constituent. For reducing the amount of the carbides, it is effective to perform annealing at a high temperature for a long period of time in a continuous annealing (CAL) process.

Further studies were conducted on the basis of the findings and, consequently, the disclosed embodiments were made. Specifically, the outline of the disclosed embodiments is as follows.

[1] A steel sheet including a composition containing, by mass, C: 0.13% to 0.40%, Si: 1.5% or less, Mn: 1.8% to 4%, P: 0.02% or less, S: less than 0.0010%, sol. Al: 0.2% or less, N: less than 0.0060%, B: 0.0003% or more and less than 0.0035%, and O: less than 0.0020%, the composition further containing one or two of Nb: 0.002% or more and less than 0.035% and Ti: 0.002% or more and less than 0.040% such that Formulae (1) and (2) are satisfied, and the balance being Fe and inevitable impurities; and a microstructure including martensite and bainite, the total area fraction of the martensite and the bainite to the entirety of the microstructure being more than 90% and 100% or less, the microstructure including prior-γ grains having an average grain size of 6 to 15 μm, the microstructure including inclusion clusters A that satisfy Conditions A below and inclusion clusters B that satisfy Conditions B below, the content of the inclusion clusters A in the microstructure being 2 clusters/mm² or less, the content of the inclusion clusters B in the microstructure being 5 clusters/mm² or less, the microstructure including carbide particles including Fe as a main constituent, the carbide particles having an aspect ratio of 2.0 or less and a major axis of 0.30 μm or more and 2 μm or less, the content of the carbide particles in the microstructure being 4000 particles/mm² or less, the steel sheet having a thickness of 0.5 to 2.6 mm and a tensile strength of 1320 MPa or more.

$$[\% Ti]+[\% Nb]>0.007 \quad \text{Formula (1)}$$

$$[\% Ti]\times[\% Nb]^2<7.5\times10^{-6} \quad \text{Formula (2)}$$

where [% Nb] and [% Ti] represent the contents (mass %) of Nb and Ti, respectively.

(Conditions A)

(i) The inclusion clusters have a major axis of 100 μm or more.

(ii) Each of the inclusion clusters is constituted by one or more inclusion particles, the inclusion particles have a major axis of 0.3 μm or more, and, in the case where the inclusion clusters are constituted by two or more inclusion particles, the shortest distance between the inclusion particles is 30 μm or less.

(Conditions B)

(i) The inclusion clusters have a major axis of 20 μm or more and less than 100 μm.

(ii) Each of the inclusion clusters is constituted by one or more inclusion particles, the inclusion particles have a major axis of 0.3 μm or more, and, in the case where the inclusion clusters are constituted by two or more inclusion particles, the shortest distance between the inclusion particles is 10 μm or less.

[2] The steel sheet described in [1], wherein carbide particles having a diameter of 10 to 200 nm are dispersed inside the martensite and/or the bainite, the content of the carbide particles in the martensite and/or the bainite being $0.3 \times 10^7$ particles/mm$^2$ or more.

[3] The steel sheet described in [1] or [2], wherein the microstructure includes retained γ, and the area fraction of the retained γ to the entirety of the microstructure is less than 5%.

[4] The steel sheet described in any one of [1] to [3], wherein the composition further contains, by mass, one or two elements selected from Cu: 0.005% to 1% and Ni: 0.01% to 1%.

[5] The steel sheet described in any one of [1] to [4], wherein the composition further contains, by mass, one or two or more elements selected from Cr: 0.01% to 1.0%, Mo: 0.01% to 0.5%, V: 0.003% to 0.5%, Zr: 0.005% to 0.2%, and W: 0.005% to 0.2%.

[6] The steel sheet described in any one of [1] to [5], wherein the composition further contains, by mass, one or two or more elements selected from Ca: 0.0002% to 0.0030%, Ce: 0.0002% to 0.0030%, La: 0.0002% to 0.0030%, and Mg: 0.0002% to 0.0030%.

[7] The steel sheet described in any one of [1] to [6], wherein the composition further contains, by mass, one or two elements selected from Sb: 0.002% to 0.1% and Sn: 0.002% to 0.1%.

[8] The steel sheet described in any one of [1] to [7], wherein the steel sheet has a coating layer deposited on the surface thereof.

[9] A method for producing a steel sheet, the method including soaking a steel slab having the composition described in any one of [1] and [4] to [7] for 100 minutes or more with a slab-heating temperature higher than 1220° C. and subsequently hot-rolling the steel slab into a hot-rolled steel sheet; cold-rolling the hot-rolled steel sheet into a cold-rolled steel sheet at a rolling reduction of 20% to 75% such that the cold-rolled steel sheet has a thickness of 0.5 to 2.6 mm; and performing annealing of the cold-rolled steel sheet, the annealing including soaking the cold-rolled steel sheet for 150 to 600 seconds at an annealing temperature of 860° C. or more and 910° C. or less, subsequently cooling from the annealing temperature to 420° C. at an average cooling rate of 2° C./s or more, and further cooling from 420° C. to 280° C. or less at an average cooling rate of 10° C./s or more.

[10] The method for producing a steel sheet described in [9], wherein, in the annealing, subsequent to the cooling to 280° C. or less, reheating as needed, holding at 120° C. to 280° C. for 15 seconds to 3 days, and subsequently cooling to a room temperature.

[11] The method for producing a steel sheet described in [9] or [10], wherein, during cooling from the annealing temperature to 420° C. at an average cooling rate of 2° C./s or more in the annealing, the steel sheet is immersed in a plating bath in order to perform coating of the steel sheet.

[12] The method for producing a steel sheet described in [11], wherein, after the steel sheet has been immersed in the plating bath in the coating, the steel sheet is heated to 480° C. to 600° C. in order to perform alloying.

Advantageous Effects

According to the disclosed embodiments, a steel sheet having a thickness of 0.5 to 2.6 mm, a high tensile strength (TS) of 1320 MPa or more, excellent delayed fracture resistance, and, in particular, excellent delayed fracture resistance at sheared end surfaces may be produced. Since the steel sheet according to the disclosed embodiments is suitable for the application where the steel sheet is formed into shape by cold pressing followed or preceded by shearing or punching, the steel sheet enables increases in the strengths of components and reductions in the weights of the components and reduces the costs.

DETAILED DESCRIPTION

Disclosed embodiments are specifically described below. The disclosure is not intended to be limited by the following specific embodiments.

First, the composition of a steel sheet according to the disclosed embodiments is described below. The contents of elements contained in the composition are all expressed in "% by mass" and, hereinafter, unless otherwise specified, denoted simply by "%".

C: 0.13% or More and 0.40% or Less (0.13% to 0.40%)

C is an element that enhances hardenability and necessary for maintaining predetermined area fractions of martensite and/or bainite and increasing the strengths of these microstructures in order to achieve a TS of 1320 MPa or more. C also forms fine carbide particles inside martensite and bainite, which serve as hydrogen-trapping sites, and thereby enhances delayed fracture resistance. If the C content is less than 0.13%, it becomes impossible to achieve the predetermined strength while maintaining excellent delayed fracture resistance. The C content is preferably 0.14% or more and is more preferably 0.16% or more. On the other hand, if the C content exceeds 0.40%, the strength of the steel sheet may be excessively increased, which makes it difficult to enhance the delayed fracture resistance to a sufficient degree. The C content is preferably 0.30% or less and is more preferably 0.25% or less. Accordingly, the C content is limited to be 0.13% to 0.40%. For achieving a TS of 1470 MPa or more while maintaining excellent delayed fracture resistance, it is desirable to adjust the C content to be more than 0.17%.

Si: 1.5% or Less

Si is an element that strengthens steel by solid-solution strengthening. Si also reduces the likelihood of film-like carbide particles being formed when the steel sheet is tempered at 200° C. or more and thereby improves the delayed fracture resistance. Si also reduces the segregation of Mn at the center of the steel sheet in the thickness direction and thereby suppresses the formation of MnS. Si also suppresses decarburization and a reduction in the B content due to oxidation of the surface layer of the steel sheet in continuous annealing. The lower limit for the Si content is not specified; for achieving the above advantageous effects by a sufficient degree, it is desirable to adjust the Si content to be 0.02% or more. The Si content is preferably 0.10% or more and is more preferably 0.20% or more. If the Si content is excessively high, the segregation of Si may be increased and, consequently, delayed fracture resistance may become degraded. Furthermore, the rolling load for hot rolling and cold rolling may be increased. In addition, the toughness of the steel sheet may become degraded. Accordingly, the Si content is limited to be 1.5% or less. The Si content is preferably 1.2% or less and is more preferably 1.0% or less. The Si content may be 0%.

Mn: 1.8% to 4%

Mn is added to the steel sheet in order to enhance the hardenability of steel and maintain predetermined area fractions of martensite and/or bainite. Mn also combines with S included in steel to form MnS, thereby fixes S, and consequently reduces hot brittleness. If the Mn content is less than 1.8%, ferrite may be formed when cooling is performed using gas or mist in an annealing line and, consequently, delayed fracture resistance at sheared end surfaces may become degraded significantly. For suppressing the formation of ferrite, it is necessary to limit the Mn content to be 1.8% or more. Mn is also an element that especially facilitates the formation and coarsening of MnS particles at the center of the steel sheet in the thickness direction. If the Mn content exceeds 4%, the numbers and sizes of significantly large inclusion clusters A and B at the center of the steel sheet in the thickness direction may be increased even in the case where the S content is minimized and, consequently, delayed fracture resistance at sheared end surfaces may become degraded significantly. Accordingly, the Mn content is limited to be 1.8% to 4%. In order to further reduce the amount of the coarse MnS particles at the center of the steel sheet in the thickness direction and thereby improve delayed fracture resistance, the Mn content is preferably adjusted to be 1.8% or more and 3.2% or less and is further preferably adjusted to be 1.8% or more and 2.8% or less.

In order to suppress the formation of ferrite and thereby improve delayed fracture resistance, the Mn content is preferably adjusted to be 1.9% or more and is further preferably adjusted to be 2.3% or more.

P: 0.02% or Less

Although P is an element that strengthens steel, if the P content is excessively high, delayed fracture resistance and spot weldability may become degraded significantly. Accordingly, the P content is limited to be 0.02% or less. The P content is preferably 0.010% or less. In order to improve delayed fracture resistance at weld zones, the P content is further preferably adjusted to be 0.005% or less. The lower limit for the P content is not specified. The lowest limitation of the P content which is industrially feasible is currently about 0.002%.

S: Less Than 0.0010%

It is necessary to strictly control the S content because S significantly degrades delayed fracture resistance at sheared end surfaces by forming MnS, TiS, Ti(C,S), and the like. In particular, MnS particles become elongated when hot-rolled. In cold rolling, furthermore, the MnS particles become elongated while being crushed. The elongated MnS particles form inclusion clusters (inclusion clusters A and B) having a length of 80 to 400 μm in the final products. In the case where the steel contains Nb and Ti and Nb(C,N), (Nb, Ti) (C,N), and the like remain during slab heating, MnS is formed in the periphery of Nb(C,N) and (Nb, Ti) (C,N) as composite precipitates and, as a result, the formation of inclusion clusters having a length of 20 μm or more and less than 100 μm (inclusion clusters B) is facilitated. Furthermore, MnS surrounding Nb(C,N) and (Nb, Ti) (C,N) reduces the peel strength of the parent phase and thereby significantly degrades delayed fracture resistance, compared with Nb(C,N) or the like. As for the thin steel sheet according to the disclosed embodiments, for example, a cast slab has a thickness of about 180 to 250 mm, while the final product, that is, a steel sheet, has a thickness of 0.5 to 2.6 mm, and the cumulative rolling reduction is about 99%. Since the elongation of a thin steel sheet in the rolling direction is five to ten times that of a thick steel sheet, the negative impacts of MnS are more significant in a thin steel sheet. The negative impacts may be particularly significant at the sheared end surfaces. Furthermore, since the entirety of the cross section of the steel sheet in the thickness direction is exposed at the sheared end surfaces, significantly large inclusion clusters A are formed in the Mn segregation zone formed at the center of the steel sheet in the thickness direction particularly at the sheared end surfaces. This especially degrades delayed fracture resistance, combined with the segregation of Mn. For reducing the negative impacts of the inclusion clusters A, it is necessary to limit the S content to be less than 0.0010%. The S content is preferably set to 0.0006% or less and is further preferably set to 0.0004% or less. The lower limit for the S content is not specified. The lowest limitation of the S content which is industrially feasible is currently about 0.0002%.

sol. Al: 0.2% or Less sol. Al is added to steel in order to perform sufficient deoxidation and reduce the amount of inclusions contained in the steel. For performing deoxidation consistently, it is desirable to adjust the sol. Al content to be 0.01% or more. However, if the sol. Al content exceeds 0.2%, carbides that include Fe as a main constituent, such as cementite, which are produced during coiling subsequent to hot rolling may become difficult to dissolve by annealing and, consequently, delayed fracture resistance may become degraded. Accordingly, the sol. Al content is limited to be 0.2% or less. The sol. Al content is preferably 0.10% or less and is more preferably 0.05% or less.

N: Less Than 0.0060%

N is an element that forms nitride and carbonitride inclusions, such as TiN, (Nb, Ti) (C,N), and AlN, in steel and thereby degrades delayed fracture resistance. Although the negative impacts of each of the above inclusions on delayed fracture are small, some of the above inclusions serve as nuclei on which MnS precipitates and are distributed together with MnS in a dotted-line manner to form significantly large inclusion clusters (inclusion clusters B), which degrade delayed fracture resistance. For suppressing the formation of the inclusion clusters, it is necessary to limit the N content to be less than 0.0060%. The N content is preferably 0.0045% or less and is more preferably 0.0040% or less. The lower limit for the N content is not specified. The lowest limitation for the N content which is industrially feasible is currently about 0.0006%.

B: 0.0003% or More and Less Than 0.0035%

B is an element that enhances the hardenability of steel and enables predetermined area fractions of martensite and/or bainite to be formed even when the Mn content is low. Moreover, when solute B remains in a steel sheet, the delayed fracture resistance may be enhanced. For achieving the above advantageous effects of B, it is necessary to adjust the B content to be 0.0003% or more. The B content is more preferably 0.0005% or more and is further preferably 0.0010% or more. If the B content is 0.0035% or more, the advantageous effects may stop increasing. Furthermore, the rate at which cementite dissolves during annealing may be reduced and, consequently, undissolved carbides that include Fe as a main constituent, such as cementite, may remain. This degrades delayed fracture resistance at sheared end surfaces. The B content is preferably 0.0030% or less and is further preferably 0.0025% or less. Thus, the B content is limited to be 0.0003% or more and less than 0.0035%.

O: Less Than 0.0020%

O is an element that forms particles of oxide inclusions, such as $Al_2O_3$, $SiO_2$, CaO, MgO, and (Al, Ca)—O having a diameter of 1 to 20 μm in steel and thereby degrades delayed fracture resistance. For reducing the negative impacts on delayed fracture resistance, it is necessary to limit the O content to be less than 0.0020%. The O content is preferably 0.0015% or less and is more preferably 0.0010% or less. The lower limit for the O content is not specified. The lowest limitation for the O content which is industrially feasible is currently about 0.0005%.

The steel sheet according to the disclosed embodiments contains at least one element selected from Nb and Ti. Even in the case where the Nb content is less than the lower limit below (less than 0.002%), Nb may be contained in the composition as inevitable impurities as long as the Ti content falls within the range of the disclosed embodiments which is described below and Formulae (1) and (2) are satisfied. Even in the case where the Ti content is less than the lower limit below (less than 0.002%), Ti may be contained in the composition as inevitable impurities as long as the Nb content falls within the range of the disclosed embodiments which is described below and Formulae (1) and (2) are satisfied. Both of the above cases fall within the scope of the disclosed embodiments.

Nb: 0.002% or More and Less Than 0.035%

Nb reduces the size of prior-γ grains, thereby facilitates the formation of martensite and bainite having a fine internal structure, the formation of fine precipitates that serve as hydrogen-trapping sites, and the formation of texture. Thereby, Nb increases the strength of the steel sheet and remarkably improves the delayed fracture resistance even when used in a trace amount. For the above reasons, it is desirable to adjust the Nb content to be 0.002% or more. The Nb content is more preferably 0.004% or more and is further preferably 0.010% or more. However, if the Nb content is excessively high, the amount of coarse Nb precipitates, such as NbN, Nb(C,N), and (Nb, Ti) (C,N), that remain undissolved during slab heating in the hot-rolling process is increased, MnS precipitates on the coarse Nb precipitates as composite inclusions, and, consequently, delayed fracture resistance at sheared end surfaces may become degraded significantly. Accordingly, it is necessary to limit the Nb content to be less than 0.035%. The Nb content is preferably 0.030% or less and is further preferably 0.020% or less.

Ti: 0.002% or More and Less Than 0.040%

Ti reduces the size of prior-γ grains, thereby facilitates the formation of martensite and bainite having a fine internal structure, the formation of fine precipitates that serve as hydrogen-trapping sites, and the formation of texture. Thereby, Ti increases the strength of the steel sheet and remarkably improves the delayed fracture resistance even when used in a trace amount. Ti also improves castability. For the above reasons, it is desirable to adjust the Ti content to be 0.002% or more. The Ti content is more preferably 0.004% or more and is further preferably 0.010% or more. However, if the Ti content is excessively high, the amount of coarse Ti precipitates, such as TiN, Ti(C,N), Ti(C,S), and TiS, that remain undissolved during slab heating in the hot-rolling process is increased, MnS precipitates on the coarse Ti precipitates as composite inclusions, and, consequently, delayed fracture resistance at sheared end surfaces may become degraded. Accordingly, it is desirable to limit the Ti content to be less than 0.040%. The Ti content is preferably 0.030% or less and is further preferably 0.020% or less.

[% Ti]+[% Nb]: More Than 0.007%

Nb and Ti are elements that improve delayed fracture resistance. For achieving the advantageous effects, at least, it is necessary to adjust the total content of Nb and Ti to be more than 0.007%. The total content of Nb and Ti is preferably 0.010% or more and is further preferably 0.015% or more. As for the upper limit, the total content of Nb and Ti is preferably 0.060% or less, is more preferably 0.050% or less, and is further preferably 0.040% or less. Note that, [% Nb] and [% Ti] represent the contents (mass %) of Nb and Ti, respectively.

$[\% Ti] \times [\% Nb]^2$: Less Than $7.5 \times 10^{-6}$

If the contents of Nb and Ti are excessively high, delayed fracture resistance may become significantly degraded as a result of the formation of the inclusion clusters B. In particular, in the case where Nb and Ti are added to steel in combination, the precipitates become stabilized and are likely to remain as coarse inclusion particles, which significantly degrade delayed fracture resistance. Therefore, it is necessary to strictly control the amounts of Nb and Ti added to steel. For reducing the negative impacts, it is necessary to control the contents of Nb and Ti such that $[\% Ti] \times [\% Nb]^2 < 7.5 \times 10^{-6}$. It is preferable that $[\% Ti] \times [\% Nb]^2 \leq 5.0 \times 10^{-6}$ be satisfied. It is more preferable that $[\% Ti] \times [\% Nb]^2 \leq 3.0 \times 10^{-6}$ be satisfied. Commonly, $[\% Ti] \times [\% Nb]^2 \geq 0.05 \times 10^{-6}$ is satisfied. Note that, [% Nb] and [% Ti] represent the contents (mass %) of Nb and Ti, respectively.

The above-described elements are the fundamental constituents. The steel sheet according to the disclosed embodiments may contain the optional elements described below as needed.

The steel sheet according to the disclosed embodiments may further contain one or two elements selected from, by mass, Cu: 0.005% to 1% and Ni: 0.01% to 1%.

Cu: 0.005% to 1%

Cu enhances the corrosion resistance under the service conditions of automobiles. Furthermore, the corrosion product of Cu covers the surface of the steel sheet to reduce the penetration of hydrogen into the steel sheet. Cu is an element that enters steel in the case where scrap is used as a raw material. Accepting the entry of Cu enables post-consumer materials to be reused as a raw material and, consequently, reduces the production costs. For the above reasons, it is preferable to limit the Cu content to be 0.005% or more. In order to enhance delayed fracture resistance, it is more desirable to limit the Cu content to be 0.05% or more. The Cu content is more preferably 0.10% or more. However, if the Cu content is excessively high, Cu may cause surface defect. Thus, it is desirable to limit the Cu content to be 1% or less. The Cu content is more preferably 0.50% or less and is further preferably 0.30% or less.

Ni: 0.01% to 1%

Similarly to Cu, Ni is an element that enhances the corrosion resistance. Ni also reduces the occurrence of surface defect, which is likely to occur in a steel sheet that contains Cu. Therefore, it is desirable to limit the Ni content to be 0.01% or more. The Ni content is more preferably 0.02% or more and is further preferably 0.04% or more. However, if the Ni content is excessively high, scale may be formed nonuniformly inside a heating furnace and, consequently, the occurrence of surface defect may be induced. In addition, the production costs may be increased. Accordingly, the Ni content is limited to be 1% or less. The Ni content is more preferably 0.50% or less and is further preferably 0.20% or less.

The steel sheet according to the disclosed embodiments may further contain one or two or more elements selected from, by mass, Cr: 0.01% to 1.0%, Mo: 0.01% to 0.5%, V: 0.003% to 0.5%, Zr: 0.005% to 0.2%, and W: 0.005% to 0.2%.

Cr: 0.01% to 1.0%

Cr enhances the hardenability of steel. For achieving the above advantageous effect, the Cr content is preferably adjusted to be 0.01% or more. The Cr content is more preferably 0.05% or more and is further preferably 0.10% or more. However, if the Cr content is more than 1.0%, the rate at which cementite dissolves during annealing may be reduced and, consequently, undissolved carbides that include Fe as a main constituent, such as cementite, may remain. This degrades delayed fracture resistance at sheared end surfaces. Moreover, pitting corrosion resistance and phosphatability become degraded. Accordingly, it is desirable to limit the Cr content to be 0.01% to 1.0%. If the Cr content exceeds 0.2%, delayed fracture resistance, pitting corrosion resistance, and phosphatability may become degraded. Thus, in order to prevent the degradation in these properties, the Cr content is more preferably adjusted to be 0.2% or less.

Mo: 0.01% or More and 0.5% or Less

The Mo content is desirably adjusted to be 0.01% or more in order to enhance the hardenability of steel, to form fine carbide particles that contain Mo, which serve as hydrogen-trapping sites, and to further improve delayed fracture resistance by forming fine martensite and bainite structures. The Mo content is more preferably 0.03% or more and is further preferably 0.05% or more. However, if the Mo content exceeds 0.5%, phosphatability may become significantly degraded. The Mo content is preferably 0.2% or less. Thus, the Mo content is desirably limited to be 0.01% or more and 0.5% or less.

V: 0.003% to 0.5%

The V content is desirably limited to be 0.003% or more in order to enhance the hardenability of steel, to form fine carbide particles that contain V, which serve as hydrogen-trapping sites, and to further improve delayed fracture resistance by forming fine martensite and bainite structures. The V content is more preferably 0.005% or more and is further preferably 0.007% or more. However, if the V content exceeds 0.5%, castability may become significantly degraded. The V content is more preferably 0.20% or less, is further preferably 0.09% or less, and is most preferably 0.01% or less. Thus, the V content is desirably limited to be 0.003% to 0.5%.

Zr: 0.005% to 0.2%

The Zr content is desirably limited to be 0.005% or more in order to enhance the hardenability of steel, to form fine carbide particles that contain Zr, which serve as hydrogen-trapping sites, and to further improve delayed fracture resistance by forming fine martensite and bainite structures. The Zr content is more preferably 0.010% or more and is further preferably 0.020% or more. However, if the Zr content is excessively high, the amount of coarse precipitates, such as ZrN and ZrS, that remain undissolved during slab heating in the hot-rolling process may be increased and, consequently, delayed fracture resistance at sheared end surfaces may become degraded. Accordingly, the Zr content is desirably 0.2% or less, is more preferably 0.1% or less, and is further preferably 0.05% or less.

W: 0.005% to 0.2%

The W content is desirably limited to be 0.005% or more in order to enhance the hardenability of steel, to form fine carbide particles that contain W, which serve as hydrogen-trapping sites, and to further improve delayed fracture resistance by forming fine martensite and bainite structures. The W content is more preferably 0.010% or more and is further preferably 0.030% or more. However, if the W content is excessively high, the amount of coarse precipitates, such as WN and WS, that remain undissolved during slab heating in the hot-rolling process may be increased and, consequently, delayed fracture resistance at sheared end surfaces may become degraded. Accordingly, the W content is desirably 0.2% or less and is more preferably 0.1% or less.

The steel sheet according to the disclosed embodiments may further contain one or two or more elements selected from, by mass, Ca: 0.0002% to 0.0030%, Ce: 0.0002% to 0.0030%, La: 0.0002% to 0.0030%, and Mg: 0.0002% to 0.0030%.

Ca: 0.0002% to 0.0030%

Ca combines with S to form CaS, thereby fixes S, and consequently improves delayed fracture resistance. For the above reasons, the Ca content is preferably limited to be 0.0002% or more. The Ca content is more preferably 0.0005% or more and is further preferably 0.0008% or more. However, adding a large amount of Ca to steel may degrade the surface qualities and bendability of the steel sheet. Accordingly, the Ca content is desirably limited to be 0.0030% or less. The Ca content is more preferably 0.0020% or less and is further preferably 0.0015% or less.

Ce: 0.0002% to 0.0030%

Similarly to Ca, Ce fixes S and thereby improves delayed fracture resistance. For the above reasons, the Ce content is preferably limited to be 0.0002% or more. The Ce content is more preferably 0.0003% or more and is further preferably 0.0005% or more. However, adding a large amount of Ce to steel may degrade the surface qualities and bendability of the steel sheet. Accordingly, the Ce content is desirably limited to be 0.0030% or less. The Ce content is more preferably 0.0020% or less and is further preferably 0.0015% or less.

La: 0.0002% to 0.0030%

Similarly to Ca, La fixes S and thereby improves delayed fracture resistance. For the above reasons, the La content is preferably limited to be 0.0002% or more. The La content is more preferably 0.0005% or more and is further preferably 0.0010% or more. However, adding a large amount of La to steel may degrade the surface qualities and bendability of the steel sheet. Accordingly, the La content is desirably limited to be 0.0030% or less. The La content is more preferably 0.0020% or less and is further preferably 0.0015% or less.

Mg: 0.0002% to 0.0030%

Mg forms MgO to fix O and thereby improves delayed fracture resistance. For the above reasons, the Mg content is preferably limited to be 0.0002% or more. The Mg content is more preferably 0.0010% or more and is further preferably 0.0015% or more. However, adding a large amount of Mg to steel may degrade the surface qualities and bendability of the steel sheet. Accordingly, the Mg content is desirably limited to be 0.0030% or less. The Mg content is more preferably 0.0025% or less and is further preferably 0.0020% or less.

The steel sheet according to the disclosed embodiments may further contain one or two elements selected from, by mass, Sb: 0.002% to 0.1% and Sn: 0.002% to 0.1%.

Sb: 0.002% to 0.1%

Sb suppresses the oxidation and nitridation of the surface layer of the steel sheet and thereby limits reductions in the contents of C and B in the surface layer. Since the reductions in the contents of C and B are limited, the formation of ferrite in the surface layer of the steel sheet can be suppressed. This increases the strength of the steel sheet and improves the delayed fracture resistance. For the above reasons, the Sb content is desirably limited to be 0.002% or more. The Sb content is more preferably 0.004% or more and is further preferably 0.006% or more. However, if the Sb content exceeds 0.1%, castability may become degraded. In addition, Sb may segregate at prior-$\gamma$ grain boundaries and degrade delayed fracture resistance at sheared end surfaces. Accordingly, the Sb content is desirably 0.1% or less. The Sb content is more preferably 0.05% or less and is further preferably 0.02% or less.

Sn: 0.002% to 0.1%

Sn suppresses the oxidation and nitridation of the surface layer of the steel sheet and thereby limits reductions in the contents of C and B in the surface layer. Since the reductions in the contents of C and B are limited, the formation of ferrite in the surface layer of the steel sheet can be suppressed. This increases the strength of the steel sheet and improves the delayed fracture resistance. For the above reasons, the Sn content is desirably limited to be 0.002% or more. The Sn content is preferably 0.003% or more. However, if the Sn content exceeds 0.1%, castability may become degraded. In addition, Sn may segregate at prior-$\gamma$ grain boundaries and degrade delayed fracture resistance at sheared end surfaces. Accordingly, the Sn content is desirably 0.1% or less. The Sn content is more preferably 0.05% or less and is further preferably 0.01% or less.

Constituents other than the above elements are Fe and inevitable impurities. In the case where the steel sheet according to the disclosed embodiments contains some of the above optional elements at concentrations less than the above lower limits, it is considered that the steel sheet includes the optional elements as inevitable impurities.

The microstructure of the steel sheet according to the disclosed embodiments is described below.

Total Area Fraction of Martensite and Bainite: More Than 90% and 100% or Less

The total area fraction of martensite and bainite to the entire microstructure is limited to be more than 90% in order to achieve a high TS of 1320 MPa or more and excellent delayed fracture resistance. If the total area fraction of martensite and bainite is smaller than the above limit, the fraction of ferrite or retained $\gamma$ (retained austenite) is increased and, accordingly, delayed fracture resistance may become degraded. The total area fraction of martensite and bainite to the entire microstructure is preferably 92% or more, is more preferably 94% or more, and is further preferably 96% or more. The total area fraction of martensite and bainite to the entire microstructure is preferably 100%. The microstructure of the steel sheet according to the disclosed embodiments includes both martensite and bainite. The fraction of bainite is preferably 1% to 25% because bainite enhances ductility.

The balance, that is, microstructures other than martensite or bainite, includes ferrite, retained $\gamma$, and the like. Examples of microstructures other than the above microstructures include nonmetallic inclusions and cementite. However, the area fractions of nonmetallic inclusions and cementite are excluded from the evaluation because the area fractions of these microstructures are considerably low. The area fraction of retained $\gamma$ is not specified but is desirably less than 5% because retained $\gamma$ degrades delayed fracture resistance.

Inclusion Clusters A

Specifically, the inclusion clusters A satisfy the following Conditions A.

(Conditions A)

(i) The inclusion clusters have a major axis of 100 μm or more.

(ii) Each of the inclusion clusters is constituted by one or more inclusion particles. The inclusion particles have a major axis of 0.3 μm or more. In the case where the inclusion clusters are constituted by two or more inclusion particles, the shortest distance between the inclusion particles is 30 μm or less.

Condition (i)

The inclusion clusters A have a major axis of 100 μm or more. It is necessary to consider inclusion clusters having a major axis of 100 μm or more and the inclusion clusters B described below separately because the inclusion clusters having a major axis of 100 μm or more may significantly degrade delayed fracture resistance.

Condition (ii)

The length of the major axis of each of the inclusion particles constituting the inclusion clusters A is 0.3 μm or more. The reason for which particular attention is focused on inclusion particles having a major axis of 0.3 μm or more is that inclusion particles having a size of less than 0.3 μm do not significantly degrade delayed fracture resistance even after they have formed aggregates. This is because the inclusion clusters A are not present at a high frequency and, when the size of the inclusion particles is less than 0.3 μm, the likelihood of cracks being connected to one another to expand is small. The term "length of the major axis" used herein refers to the length of an inclusion particle in the rolling direction.

In the case where the inclusion clusters A are constituted by two or more inclusion particles, the shortest distance between the inclusion particles is 30 μm or less. Narrowing down inclusion clusters from the inclusion clusters that satisfy Condition (i) in this manner enables an appropriate definition of inclusion clusters that affect delayed fracture resistance. Adjusting the number of the inclusion clusters defined as described above per unit area (mm$^2$) improves delayed fracture resistance. In the measurement of shortest distance, inclusion particles present inside a sector of a circle with a center at the edge of an inclusion particle in the longitudinal direction, the two radii of the sector forming an angle of ±10° with respect to the rolling direction, are taken into account (an inclusion particle that is partially included in the sector is also taken into account). The term "shortest distance between each adjacent two of the inclusion particles" used herein refers to the shortest distance between points on the peripheries of the respective particles.

The shape of the inclusion particles constituting the inclusion clusters A and the manner in which the inclusion particles are present are not limited. In embodiments, normally, the inclusion particles may be inclusion particles elongated in the rolling direction or inclusion particles distributed in a dotted-line manner in the rolling direction. The term "inclusion particles distributed in a dotted-line manner in the rolling direction" used herein refers to a cluster of two or more inclusion particles distributed in a dotted-line manner in the rolling direction. The expression "distributed in a dotted-line manner in the rolling direction" means the state similar to the state where, for example, inclusion particles elongated in the rolling direction are divided into pieces in cold rolling to be distributed in a dotted-line manner. Note that the above description is provided for explaining the manner in which the inclusion particles may be present; it is not intended that the manner in which the inclusion particles are present is limited to the state where inclusion particles are divided into pieces in cold rolling to be distributed in a dotted-line manner.

In the disclosed embodiments, the number density (distribution density) of the inclusion clusters A that satisfy the above conditions is limited to be 2 clusters/mm$^2$ or less. For enhancing delayed fracture resistance at sheared end surfaces, it is necessary to reduce, by a sufficient degree, the amount of the above-described inclusion clusters composed of MnS, oxides, and nitrides which are included in the region extending from the surface layer to the center of the steel sheet in the thickness direction and, in particular, in the region around the center of the steel sheet in the thickness direction. For reducing the occurrence of cracking at the sheared end surfaces even in a component produced using a high-strength steel having a TS of 1320 MPa or more, it is necessary to reduce the distribution density of the above-described inclusion clusters to be 2 clusters/mm$^2$ or less. It is preferable to reduce the distribution density of the inclusion clusters to be 0 cluster/mm$^2$. In the case where each of the inclusion clusters is constituted by only one inclusion particle, an inclusion particle having a major axis of 100 μm or more is considered as one inclusion cluster, and the number of such inclusion clusters per square millimeter is counted.

Inclusion Clusters B

Specifically, the inclusion clusters B satisfy Conditions B below.

(Conditions B)

(i) The inclusion clusters have a major axis of 20 μm or more and less than 100 μm.

(ii) Each of the inclusion clusters is constituted by one or more inclusion particles. The inclusion particles have a major axis of 0.3 μm or more. In the case where the inclusion clusters are constituted by two or more inclusion particles, the shortest distance between the inclusion particles is 10 μm or less.

Condition (i)

The inclusion clusters B have a major axis of 20 μm or more and less than 100 μm. The length of the major axis of each of the inclusion clusters B is limited to be 20 μm or more because inclusion clusters having a major axis of less than 20 μm do not significantly degrade delayed fracture resistance. Inclusion clusters having a major axis of more than 100 μm, which significantly degrade delayed fracture resistance, are considered as inclusion clusters A. The term "length of the major axis" used herein refers to the length of an inclusion cluster in the rolling direction.

Condition (ii)

The inclusion particles have a major axis of 0.3 μm or more. The reason for which particular attention is focused on inclusion particles having a major axis of 0.3 μm or more is that inclusion particles having a size of less than 0.3 μm do not significantly degrade delayed fracture resistance even after they have formed aggregates. The term "length of the major axis" used herein refers to the length of inclusion particles in the rolling direction. In the case where the inclusion clusters B are constituted by two or more inclusion particles, the shortest distance between each adjacent two of the inclusion particles is 10 μm or less. Narrowing down inclusion clusters from the inclusion clusters that satisfy Condition (i) in this manner enables an appropriate definition of inclusion clusters that affect delayed fracture resistance. Adjusting the number of the inclusion clusters defined as described above per unit area (mm$^2$) improves delayed fracture resistance. In the measurement of shortest distance, inclusion particles present inside a sector of a circle with a center at the edge of an inclusion particle in the longitudinal direction, the two radii of the sector forming an angle of ±10° with respect to the rolling direction, are taken into account (an inclusion particle that is partially included in the sector is also taken into account). The term "shortest distance between each adjacent two of the inclusion particles" used herein refers to the shortest distance between points on the peripheries of the respective particles. The shortest distance between a cluster of particles and a particle is the shortest distance between a point on the periphery of the particle and particles constituting the cluster. The shortest distance between two clusters of particles is the shortest distance between the particles constituting one of the clusters and the particles constituting the other cluster.

The shape of inclusion particles constituting the inclusion clusters B and the manner in which the inclusion particles are present are not limited. In embodiments, normally, the inclusion particles may be inclusion particles elongated in the rolling direction or inclusion particles distributed in a dotted-line manner in the rolling direction, as in the case of the inclusion clusters A.

In embodiments, the number density of the inclusion clusters B that satisfy the above conditions is limited to be 5 clusters/mm$^2$ or less. For enhancing delayed fracture resistance at sheared end surfaces, it is necessary to reduce, by a sufficient degree, the amount of the inclusion clusters B composed of MnS, oxides, and nitrides which are included in the region extending from the surface layer to the center of the steel sheet in the thickness direction and, in particular, in the region around the center of the steel sheet in the thickness direction. For reducing the occurrence of cracking at the sheared end surfaces even in a component produced using a high-strength steel having a TS of 1320 MPa or more, it is necessary to reduce the number density of the above-described inclusion clusters to be 5 clusters/mm$^2$ or less. The number density of the inclusion clusters is preferably 4 clusters/mm$^2$ or less and is further preferably 3 clusters/mm$^2$ or less. It is preferable to reduce the number density of the inclusion clusters B to 0 cluster/mm$^2$. In the case where each of the inclusion clusters is constituted by only one inclusion particle, an inclusion particle having a major axis of 20 μm or more and less than 100 μm is considered as one inclusion cluster, and the number of such inclusion clusters per square millimeter is counted.

Carbide Particles Including Fe as Main constituent and Having Aspect Ratio of 2.0 or Less and Major Axis of 0.30 μm or More and 2 μm or Less: 4000 Particles/mm$^2$ or Less As a result of detailed study of the relationship between delayed fracture resistance at sheared end surfaces and the inclusion particles, it was found that carbides that include Fe as a main constituent, such as cementite, do not completely dissolve under the common annealing conditions and may remain in a certain amount. It was also found that the undissolved carbides that include Fe as a main constituent, that is, specifically, coarse carbide particles that have an aspect ratio of 2.0 or less and a major axis of 0.30 μm or more and 2 μm or less and include Fe as a main constituent, adversely affect delayed fracture resistance at sheared end surfaces. The coarse carbide particles are clearly different from fine carbide particles present inside grains or film-like coarse precipitates present at grain boundaries which precipitate during tempering.

The reason for which particular attention is focused on carbide particles having an aspect ratio of 2.0 or less and a major axis of 0.30 µm or more and 2 µm or less is that it was found that coarse carbide particles having an aspect ratio of 2.0 or less and a major axis of 0.30 µm or more and 2 µm or less and including Fe as a main constituent adversely affect delayed fracture resistance at sheared end surfaces.

The carbides that include Fe as a main constituent are specifically Fe—C carbides, such as cementite (θ), η, χ, and ε, that include small amounts of Mn, Si, B, Cr, Mo, and the like dissolved therein. The term "main constituent" used herein means that the proportion of Fe to the elements other than carbon, such as Fe, Mn, Si, B, Cr, and Mo, is 50 at % or more.

The amount of the above-described carbide particles that include Fe as a main constituent needs to be reduced to 4000 particles/mm$^2$ or less, is preferably reduced to 2000 particles/mm$^2$ or less, and is further preferably reduced to 1500 particles/mm$^2$ or less. It is preferable to reduce the amount of the carbide particles that include Fe as a main constituent to 0 particle/mm$^2$.

It is possible to distinguish the fine carbide particles present inside grains and the film-like precipitates present at grain boundaries which are precipitated during tempering from the carbide particles that include Fe as a main constituent because, as described below, the fine carbide particles and film-like precipitates do not appear black in an SEM backscattered electron image, while the above-described carbide particles appear black.

Average Size of Prior-γ Grains: 6 to 15 µm

For improving the resistance of a steel containing Nb and Ti to delayed fracture, it is effective to adequately increase the size of γ grains by high-temperature annealing. The mechanisms by which the above advantageous effects are achieved are not clear; it is considered that a texture advantageous for the improvement of delayed fracture resistance may be developed when the γ grains are grown by high-temperature annealing. In order to improve delayed fracture resistance, the average size of prior-γ grains is limited to be 6 to 15 µm. As for the lower limit, the average size of prior-γ grains is preferably 7 µm or more, is more preferably 8 µm or more, and is further preferably 9 µm or more. As for the upper limit, the average size of prior-γ grains is preferably 12 µm or less and is more preferably 10 µm or less. The term "average size of prior-γ grains" used herein refers to average grain size.

Carbide Particles Having Diameter of 10 to 200 nm Distributed Inside Martensite and/or Bainite: 0.3×10$^7$ Particles/mm$^2$ or More Fine carbide particles distributed inside martensite and/or bainite are carbide particles composed primarily of Fe which are precipitated mainly during tempering. The above carbide particles increase the degree of smoothness and flatness of the fracture surface formed as a result of shearing and also serve as hydrogen-trapping sites under a hydrogen-penetrating environment. Therefore, the amount of carbide particles having a diameter of 10 to 200 nm which are distributed inside tempered martensite and/or bainite is preferably 0.3× 10$^7$ particles/mm$^2$ or more, is more preferably 0.5×10$^7$ particles/mm$^2$ or more, and is further preferably 0.7×10$^7$ particles/mm$^2$ or more. The upper limit is not specified but is preferably about 0.7×10$^7$ to 10×10$^7$ particles/mm$^2$. If the amount of such carbide particles exceeds the upper limit, the strength of the steel sheet may be excessively increased and, as a result, the delayed fracture resistance may become degraded. In the case where the carbide particles having a diameter of 10 to 200 nm are included in both martensite and bainite, the number of the carbide particles included in martensite and the number of the carbide particles included in bainite are counted. In the case where the carbide particles are included only in martensite or bainite, the number of carbide particles having a diameter of 10 to 200 nm which are included in the microstructure containing the carbide is counted and the density of the carbide particles per area is calculated with respect to the total area of martensite and bainite.

The carbides that include Fe as a main constituent are specifically Fe—C carbides, such as cementite (θ), η, χ, and ε, that include small amounts of Mn, Si, B, Cr, Mo, and the like dissolved therein. The term "main constituent" used herein means that the proportion of Fe to the elements other than carbon, such as Fe, Mn, Si, B, Cr, and Mo, is 50 at % or more.

The methods for analyzing and determining the above microstructures are described below.

The total area fraction of martensite and bainite and the area fraction of ferrite, which is the balance, can be determined by grinding an L-cross section of the steel sheet (the vertical cross section of the steel sheet which is parallel to the rolling direction), etching the L-cross section with nital, observing a portion of the L-cross section which is ¼ the thickness of the steel sheet below the surface in the thickness direction with a SEM at a 2000-fold magnification in 4 fields of view, and analyzing the resulting microstructure images. In the SEM images, martensite and bainite appear gray or white, while ferrite appears black in contrast. Bainitic ferrite, which is formed at a temperature higher than 400° C., is classified as ferrite in the measurement because the amount of dislocation present inside bainitic ferrite is trace and the properties of bainitic ferrite are substantially the same as those of ferrite. Martensite and bainite include trace amounts of carbide, nitride, sulfide, and oxide. In the calculation of the area fraction of martensite and bainite, the area fraction of regions that include these trace substances is also taken into account because it is difficult to exclude the area fraction of the trace substances. In the case where retained γ is present, the area fraction of martensite and bainite is calculated by subtracting the area fraction of retained γ which is determined by X-ray diffractometry from the area fraction of martensite and bainite which is determined by the above SEM observation.

Bainite has the following features. Specifically, bainite is a microstructure that is constituted by plate-like grains having an aspect ratio of 2.5 or more and blackish compared with martensite. The width of the plate-like grains is 0.3 to 1.7 µm. The density at which carbide particles having a diameter of 10 to 200 nm (hereinafter, referred to also as "carbide particles B") are distributed inside bainite is 0 to 3 particles/µm$^2$.

The volume fraction of retained γ determined using X-ray is used as the area fraction of retained γ, on the assumption that the volume fraction of retained γ is equal to the area fraction of retained γ. The volume fraction of retained γ can be determined using, for example, the integrated intensity ratios of the (200), (211), and (220) planes of α and the (200), (220), and (311) planes of γ measured by analyzing the steel sheet at the ¼-thickness position by X-ray diffraction with a Kα X-ray source that includes a Co target.

The number densities of the inclusion clusters A and the inclusion clusters B per square millimeter are determined by grinding an L-cross section of the steel sheet (the vertical cross section of the steel sheet which is parallel to the rolling direction), then, without etching the L-cross section, taking an image of 1-mm$^2$ region of a portion of the L-cross section which is ⅛t to ⅜t below the surface layer of the steel sheet (t represents the thickness of the steel sheet), that is, a region of the L-cross section which extends from the position ⅕ the thickness of the steel sheet below the front surface in the thickness direction to the position ⅕ the thickness of the steel sheet below the rear surface in the thickness direction across the center of the steel sheet in the thickness direction, with a SEM continuously in about 100 fields of view, and counting the numbers of such inclusion clusters in the resulting SEM images. The reasons for which the portion of the L-cross section which is ⅕t to ⅘t below the surface layer of the steel sheet is measured are that the frequencies at which the inclusion clusters A and B are present in the surface layer of the steel sheet are low, while the frequencies at which the inclusion clusters A and B are present in the vicinity of the center of the steel sheet are particularly high, and, accordingly, initial cracks are likely to be formed in the vicinity of the center of the steel sheet. It is preferable to analyze the images at a 2000-fold magnification. Since the inclusion clusters A are present in the form of thin film-like clusters, it is difficult to identify the clusters and accurately measure the lengths of the clusters when a cross section of the steel sheet parallel to the rolling direction is observed or when the observation is made using an optical microscope.

The SEM images used in the above measurement are preferably backscattered electron images. The images are preferably taken at a 1000-fold magnification. In the case where the size of the inclusion particles and the distance between the inclusion particles are difficult to accurately measure, each of the inclusion particles may be magnified 5000 fold as needed and the presence of the above inclusion clusters may be determined from the images.

The shortest distance between each adjacent two of the inclusion particles, which is the distance between the surfaces of the respective inclusion particles as described above, is the distance between the surfaces of the inclusion particles which can be measured using the images. The direction in which the shortest distance is measured is limited to, as described above, the rolling direction or a direction inclined at an angle of ±10 degrees with respect to the rolling direction.

When an inclusion cluster is constituted by two or more inclusion particles, the overall length of the inclusion cluster in the rolling direction (the length of the major axis of the inclusion cluster) is the distance in the rolling direction between an edge of the inclusion particle located at one of the ends of the inclusion cluster in the rolling direction and an edge of the inclusion particle located at the other end of the inclusion cluster, the edges of the inclusion particles facing outward of the inclusion cluster. When an inclusion cluster is constituted by one inclusion particle, the overall length of the inclusion cluster in the rolling direction is the length of the inclusion particle in the rolling direction.

Inclusion particles constituting the inclusion clusters are primarily particles of Mn-, Ti-, Zr-, Ca-, and REM-sulfides, Al-, Ca-, Mg-, Si-, and Na-oxides, Ti-, Zr-, Nb-, and Al-nitrides, and Ti-, Nb-, Zr-, and Mo-carbides. Most of the above inclusion clusters are inclusion clusters that are formed in the casting process and subsequently remain undissolved during slab heating. The others are inclusion clusters formed by the above substances reprecipitating with the undissolved clusters as composite precipitates or by the above substances reprecipitating as a result of coming into contact with the undissolved clusters during the subsequent hot-rolling, coiling, and annealing processes. Note that the above-described inclusion particles do not include the carbides that include Fe as a main constituent.

The number (distribution density) of carbide particles that include Fe as a main constituent and have an aspect ratio of 2.0 or less and a major axis of 0.30 μm or more and 2 μm or less (hereinafter, such carbide particles are referred to also as "carbide particles A") per square millimeter can be determined by grinding an L-cross section of the steel sheet (the vertical cross section of the steel sheet which is parallel to the rolling direction) and, without etching the L-cross section or after slightly etching the L-cross section with nital, taking an image of a portion of the L-cross section which is ¼ the thickness of the steel sheet below the surface in the thickness direction with a SEM at a 5000-fold magnification in 15 fields of view. The term "aspect ratio" used herein refers to "Major axis length/Minor axis length". In the observation plane, the minor and major axis directions intersect each other at right angles.

The SEM images are preferably backscattered electron images. The carbide particles A appear black in the backscattered electron images. The carbide particles having a diameter of 10 to 200 nm (hereinafter, such carbide particles are referred to also as "carbide particles B") which are distributed inside martensite and/or bainite, which are described below, can be distinguished from the carbide particles A in the measurement because the carbide particles B do not appear black in the backscattered electron images.

Whether or not carbide particles are composed primarily of Fe can be determined by conducting the elemental analysis of the particles using EDX.

The average size of prior-γ grains can be determined by grinding an L-cross section of the steel sheet (the vertical cross section of the steel sheet which is parallel to the rolling direction), etching the L-cross section with a chemical solution used for etching prior-γ grain boundaries (e.g., a saturated aqueous solution of picric acid or a mixture of a saturated aqueous solution of picric acid with ferric chloride), and observing a portion of the L-cross section which is ¼ the thickness of the steel sheet below the surface in the thickness direction with an optical microscope at a 400-fold magnification in randomly selected 4 fields of view. The size of prior-γ grains can be measured using the resulting images by an intercept method. Specifically, 20 straight lines are drawn on each of the images in the rolling direction and the direction perpendicular to the rolling direction (the thickness direction). The number of grain boundaries that intersect any of the straight lines is counted. The total length of the straight lines is divided by the total number of the grain boundaries and multiplied by 1.13 to give the size of prior-γ grains.

The number (distribution density) of carbide particles having a diameter of 10 to 200 nm which are distributed inside martensite and/or bainite (hereinafter, such carbide particles are referred to also as "carbide particles B") can be determined by taking a secondary electron image of a portion of the sample that has been used for the measurement of the area fractions of the phases and etched with nital which is ¼ the thickness of the steel sheet below the surface in the thickness direction with a SEM at a 10000-fold magnification in 4 fields of view and analyzing the image at a 25000-fold magnification.

The carbide particles B are present inside grains of martensite and bainite and appear white. The diameter of the carbide particles B can be determined by $(a \times b)^{0.5}$, which is an equivalent-circle diameter, where a is the length of the major axis and b is the length of the single axis.

The thickness and tensile strength TS of the steel sheet according to the disclosed embodiments are limited as follows.

Thickness: 0.5 to 2.6 mm

The larger the thickness of the steel sheet, the greater the difficulty in forming the steel sheet into shape by bending, which needs to be done for producing automotive components. For example, if the thickness of the steel sheet exceeds 2.6 mm, it becomes impossible to achieve a bending angle of 90 degrees or more with a bend radius of 5 mm or less and therefore, it becomes difficult to use the steel sheet for producing automotive components. On the other hand, it is considerably difficult to reduce the thickness of a high-strength steel sheet having a TS of 1320 MPa or more to be less than 0.5 mm in view of an increase in the rolling load. Accordingly, the thickness of the steel sheet is limited to be 0.5 to 2.6 mm. As for the lower limit, the thickness of the steel sheet is preferably 0.6 mm or more and is more preferably 0.8 mm or more. As for the upper limit, the thickness of the steel sheet is preferably 2.0 mm or less and is more preferably 1.8 mm or less.

Tensile Strength TS: 1320 MPa or More

The degradation in delayed fracture resistance at sheared end surfaces becomes significant particularly when the tensile strength of a steel sheet is 1320 MPa or more. One of the features of the disclosed embodiments is that the steel sheet according to the disclosed embodiments has high delayed fracture resistance at the sheared end surfaces even when the steel sheet has a TS of 1320 MPa or more. Accordingly, herein, a steel sheet having a tensile strength of 1320 MPa or more is discussed. As for the upper limit for tensile strength, the tensile strength of the steel sheet according to the disclosed embodiments is commonly 2000 MPa or less or 1900 MPa or less.

It is considered that the steel sheet according to the disclosed embodiments has excellent delayed fracture resistance when, in the evaluation of delayed fracture property described in Examples, the steel sheet is evaluated as "No fracture" in the case where the steel sheet has a TS of 1320 MPa or more and less than 1500 MPa; when the delayed-fracture time is 24 hrs or more in the case where the steel sheet has a TS of 1500 MPa or more and less than 1550 MPa; when the delayed-fracture time is 6 hrs or more in the case where the steel sheet has a TS of 1550 MPa or more and less than 1670 MPa; and when the delayed-fracture time is 1.0 hr or more in the case where the steel sheet has a TS of 1670 MPa or more.

The yield strength (YP) of the steel sheet is commonly 800 MPa or more and 1500 MPa or less, and the total elongation (El) of the steel sheet is commonly 5% or more and 15% or less, although these limitation are not necessary for addressing the issues of the disclosed embodiments.

The above-described steel sheet according to the disclosed embodiments may be a steel sheet provided with a coating layer deposited on the surface. The coating layer may be formed by Zn coating or coating using a metal other than Zn. The coating layer may be a hot-dip coating layer or an electroplating layer. In the disclosed embodiments, a hot-dip galvanizing layer and an alloyed hot-dip galvanizing layer are preferable.

The method for producing the steel sheet according to the disclosed embodiments is described below.

Slab-Heating Temperature: Higher Than 1220° C.

Examples of the method of hot-rolling a steel slab include a method in which the slab is heated and subsequently rolled; a method in which a slab formed by continuous casting is directly rolled without being heated; and a method in which a slab formed by continuous casting is heated for a short period of time and subsequently rolled. In the production method according to the disclosed embodiments, it is essential to heat a slab at a temperature higher than 1220° C. Heating a slab at a temperature (surface temperature) higher than 1220° C. facilitates the dissolution of sulfides and carbonitrides, reduces the segregation of Mn and, consequently, results in reductions in the sizes and numbers of the above-described inclusion clusters. Accordingly, the slab-heating temperature is limited to be higher than 1220° C. The upper limit for the slab-heating temperature is not specified. The slab-heating temperature is normally set to 1400° C. or less. The average heating rate at which a slab is heated may be set to 5 to 15° C./minute.

Slab-Soaking Time: 100 min or More

The slab is held such that the amount of time (soaking time) during which the slab-surface temperature is maintained to be a temperature higher than 1220° C. is 100 min or more. The results of the study conducted by the inventors revealed that one of the primary reasons for the retention of the inclusion clusters B is that, even when the slab-heating temperature is equal to or higher than the temperature at which the inclusions dissolve, the amount of time during which heating is performed is insufficient and, consequently, the dissolution of the inclusions is not in equilibrium. Soaking the slab for a sufficient amount of time facilitates the dissolution of sulfides and carbonitrides and thereby improves delayed fracture resistance. If the soaking time is less than 100 min, Nb- and Ti-carbonitrides may fail to dissolve sufficiently and remain in the steel. Furthermore, MnS may precipitate with the carbonitride particles serving as nuclei and thereby degrade delayed fracture resistance. The upper limit for the soaking time is not specified; the holding time is 250 min or less, is more preferably 200 min or less, and is further preferably 175 min or less.

The ratio $\varepsilon 2/\varepsilon 1$ of the elongation strain $\varepsilon 1$ of the steel which is calculated from the rolling reduction (the true strain of the steel calculated on the assumption that the deformation of the steel sheet in the width direction is negligible) to the elongation strain $\varepsilon 2$ of the major axes of inclusion clusters constituted by MnS based inclusions (in the case where MnS inclusions are crushed, an increase in the distance between the inclusions due to the crush of the inclusions is included in the increase in the length of the major axis) is 0.60 and 0.65 in hot rolling and cold rolling, respectively. This confirms that the inclusion particles are elongated in either process.

This means that the elongation of the inclusion particles can be limited by setting the rolling reduction at which cold rolling is performed to be smaller than the rolling reduction at which hot rolling is performed but the advantageous effects achieved by adjusting the proportion between rolling reductions are considerably small and the cumulative rolling reduction is a dominant factor. In other words, it is important to reduce the thickness of the cast slab compared with the thickness of the steel sheet that is the final product. However, in reality, reducing the thickness of a slab degrades the productivity. Accordingly, the thickness of a cast slab is preferably set to 100 to 250 mm and is particularly preferably set to 150 to 200 mm. In accordance with the conventional methods, the cumulative rolling reduction at 950° C. or more may be set to 90% to 98%, and the cumulative rolling reduction achieved in the temperature range of 950° C. or less which includes cold rolling may be set to 50% to 92%.

It is preferable to perform finishing at a finishing temperature of 840° C. to 950° C., subsequently reduce the temperature to a temperature range of higher than 450° C. to 630° C. at a cooling rate of 10° C./s or more and 200° C./s or less, and then perform coiling. The finishing temperature (FT) is set to 840° C. to 950° C. in order to facilitate transformation and is preferably minimized so as not to be lower than the Ar$_3$ transformation temperature. In the disclosed embodiments, setting the coiling temperature to 560° C. or less may facilitate the formation of the desired microstructure. The coiling temperature is set to be higher than 450° C. in order to adjust the average prior-γ grain size to be 6 μm or more.

In order to reduce variations in the thickness of the steel sheet (coil), it is preferable to reduce, subsequent to the finishing, the temperature to 600° C. or less at a cooling rate of 30° C./s or more and 200° C./s or less and performing coiling at 530° C. or less. It is also preferable to minimize the coiling temperature (CT) in order to reduce the amount of the carbide particles that include Fe as a main constituent and have an aspect ratio of 2.0 or less and a major axis of 0.30 μm or more and 2 μm or less. The coiling temperature is preferably set to, specifically, 530° C. or less.

As needed, the resulting coil is cooled with water while being rotated and subsequently removed from a coiler. It is preferable to minimize the amount of time during which the water cooling is performed. It is more preferable to omit the water cooling. After coiling has been performed at a temperature range of higher than 450° C. and 630° C. or less, the coil may be directly cooled with water or may be unwound and then cooled with water or a gas in order to reduce the occurrence of surface oxidation and inhomogeneous transformation. The above-described rapid cooling also reduces the amount of the carbide particles that include Fe as a main constituent and have an aspect ratio of 2.0 or less and a major axis of 0.30 μm or more and 2 μm or less.

It is desirable to perform descaling in order to remove primary scale and secondary scale formed on the surface of the steel sheet. It is preferable to perform descaling with a high impact pressure of 500 MPa or more. Such a descaling treatment reduces the amount of red scale that remains on the steel sheet and the thickness of the secondary scale formed on the steel sheet, thereby limits the likelihood of oxygen included in the scale entering the steel sheet during coiling performed in the hot-rolling process, and consequently reduces the oxidation of the surface of the steel sheet caused by the oxygen. As a result, the thickness of an oxide layer formed on the surface of the final product can be reduced. This enhances the corrosion resistance of the steel sheet. Moreover, it becomes possible to limit reductions in the contents of C and B in the vicinity of the surface layer of the steel sheet which are caused as a result of oxidation of these elements in the surface layer. This suppresses the formation of ferrite in the surface layer of the steel sheet in the continuous annealing described below and, consequently, improves delayed fracture resistance at sheared end surfaces.

It is preferable to sufficiently pickle the hot-rolled coil prior to cold rolling in order to reduce the amount of remaining scale. Optionally, the hot-rolled steel sheet may be annealed in order to reduce the load required for cold rolling.

Rolling Reduction in Cold Rolling: 20% to 75%

Cold rolling is performed at a rolling reduction of 20% to 75% such that the cold-rolled steel sheet has a thickness of 0.5 to 2.6 mm; the other conditions may be set in accordance with the conventional methods. As for the lower limit, the rolling reduction is preferably 30% or more and is more preferably 40% or more. As for the upper limit, the rolling reduction is preferably 72% or less and is more preferably 70% or less. As for the lower limit for the thickness of the steel sheet, the thickness of the steel sheet is preferably 0.6 mm or more, is more preferably 0.8 mm or more, and is further preferably 1.0 mm or more. As for the upper limit for the thickness of the steel sheet, the thickness of the steel sheet is preferably 2.4 mm or less, is more preferably 2.1 mm or less, and is further preferably 1.8 mm or less.

Annealing

The cold-rolled steel sheet is subjected to annealing and tempering treatment (including self-tempering treatment) in a continuous annealing line (CAL) and subsequently temper-rolled as needed. In this step, it is important to adjust the microstructure such that the following items are achieved:

(1) formation of the predetermined area fraction of martensite and bainite;

(2) reduction in the amount of undissolved carbide particles (carbide particles that include Fe as a main constituent and have an aspect ratio of 2.0 or less and a major axis of 0.30 μm or more and 2 μm or less) (facilitation of dissolution of the carbide particles during annealing);

(3) formation of prior-γ grains having an adequate diameter; and (4) fine dispersion of carbide particles inside martensite and/or bainite.

In order to achieve the items (1) to (4), the following points should be considered.

That is, annealing should be performed at a high temperature for a long period of time (corresponds to (1) and (2)); performing annealing at an excessively high temperature or for an excessively long period of time should be avoided (corresponds to (3)); subsequent to annealing, the temperature should be reduced quickly from the high temperature (corresponds to (1)); and tempering should be performed at predetermined temperatures for a predetermined amount of time (corresponds to (4)).

Soaking for 150 to 600 Seconds With Annealing Temperature of 860° C. or More and 910° C. or Less As described above, the carbide particles that include Fe as a main constituent and have an aspect ratio of 2.0 or less and a major axis of 0.30 μm or more and 2 μm or less (carbide particles A) are carbide particles, such as cementite particles, that remain undissolved in the steel sheet after annealing. For reducing such carbide particles by a sufficient degree, it is necessary to perform annealing at a high temperature for a long period of time. Specifically, it is necessary to perform soaking for 150 seconds or more with an annealing temperature of 860° C. or more. However, if the annealing temperature exceeds 910° C. or the amount of soaking time exceeds 600 seconds, the size of prior-γ grains may be excessively increased and, consequently, delayed fracture resistance may become degraded. Accordingly, soaking is performed for 150 to 600 seconds with an annealing temperature of 860° C. or more and 910° C. or less. It is more preferable to perform soaking for 300 to 600 seconds with an annealing temperature of 870° C. to 900° C. As well as the conditions under which the temperature is reduced from the annealing temperature, the annealing temperature and the amount of soaking time are responsible for adjusting the total area fraction of martensite and bainite to be within the desired range.

Reducing Temperature from Annealing Temperature to 420° C. at Average Cooling Rate of 2° C./s or More For reducing the amount of balance microstructures, such as ferrite and retained γ, in order to adjust the total area fraction of martensite and bainite to be 90% or more, it is necessary to reduce the temperature from the annealing temperature to 420° C. at an average cooling rate of 2° C./s or more. If the average cooling rate is lower than 2° C./s, a large amount of ferrite may be formed. In addition, carbon concentrates at γ and thereby hardens martensite and, consequently, delayed fracture resistance may become degraded. The upper limit for the average cooling rate is not limited and is normally set to about 100° C./s.

Average Cooling Rate at which Temperature is Reduced from 420° C. to 280° C. or Less: 10° C./s or More If the cooling rate at which the temperature is reduced from 420° C. to 280° C. or less is low, bainitic ferrite and fine lower bainite may be formed and, consequently, the strength of the steel sheet may be reduced. In addition, the amount of retained γ is increased, which leads to degradation in delayed fracture resistance. Furthermore, coarse carbide particles may be formed inside martensite and bainite, which results in degradation in delayed fracture resistance. It is desirable to rapidly reduce the temperature in the above temperature range. Accordingly, the average cooling rate at which the temperature is reduced from 420° C. to 280° C. or less is limited to be 10° C./s or more. The average cooling rate is preferably 20° C./s or more and is more preferably 70° C./s or more. The upper limit for the average cooling rate is not specified but is normally about 2000° C./s. For forming 1% or more bainite, it is desirable to reduce the temperature from 420° C. to 280° C. at an average cooling rate of 1000° C./s or less or perform holding at 280° C. to 230° C. for 5 seconds or more.

In the case where the steel sheet is subjected to hot-dip coating, it is desirable to perform coating by immersing the steel sheet in a plating bath when the temperature is reduced from the annealing temperature to 420° C. Subsequent to the immersion in a plating bath, optionally, the coated steel sheet may be heated at 480° C. to 600° C. to perform an alloying treatment.

After the temperature has been reduced to 280° C. or less as described above, reheating may be performed as needed and holding is subsequently performed at 120° C. to 280° C. for 15 seconds to 3 days.

The carbide particles having a diameter of 10 to 200 nm which are distributed inside martensite and/or bainite are carbide particles formed while holding is performed at low temperatures subsequent to quenching. For adjusting the distribution density to be $0.2 \times 10^7$ particles/mm$^2$ or more, it is advantageous to rapidly reduce the temperature to about room temperature, subsequently perform reheating at 120° C. to 280° C., and then perform holding for 15 seconds to 3 days or to adjust the cooling-stop temperature to be 120° C. to 280° C. and control the amount of holding time to be 15 seconds to 3 days. The above thermal history may be achieved by adjusting the holding temperature to be 280° C. or less and reducing the cooling rate or by reducing the temperature to room temperature and subsequently performing batch annealing.

If the holding temperature is less than 120° C. or the amount of holding time is less than 15 seconds, the density at which the carbide particles are distributed inside martensite or bainite is reduced and, consequently, improvement in delayed fracture resistance may be limited. If the holding temperature exceeds 280° C., coarsening of carbide particles occurs inside prior-γ grains and at the prior-γ grain boundaries and, consequently, the density at which the carbide particles are distributed inside martensite or bainite may become insufficient. The amount of holding time is preferably 30 seconds or more and 5 hr or less.

The steel sheet cooled from 420° C. to 280° C. or less or the steel sheet held at 120° C. to 280° C. for 15 seconds to 3 days and subsequently cooled to room temperature may be optionally subjected to temper rolling (skin pass rolling) in order to enhance consistency in press formability, that is, for example, to adjust the surface roughness of the steel sheet and increase the flatness and smoothness of the steel sheet. In such a case, the skin-pass elongation is preferably 0.05% to 0.6%. In skin pass rolling, it is preferable to use a dull roll as a skin pass roll and adjust the roughness Ra of the steel sheet to be 0.8 to 1.8 μm in order to increase the flatness and smoothness of the steel sheet.

The steel sheet according to the disclosed embodiments may be coated by, as described above, performing hot-dip coating when cooling is performed subsequent to soaking performed in the annealing treatment or by performing electroplating subsequent to soaking performed in the annealing treatment. The type of the coating include Zn coating (Zn coating, Zn—Ni coating, or Zn—Fe coating) and Al coating. It is desirable to perform a heat treatment at 280° C. or less subsequent to hot-dip coating or electroplating in order to reduce the amount of hydrogen included in the steel.

EXAMPLES

Each of the steels assigned with Steel Nos. A to W which are shown in Table 1 was prepared and cast into a slab having a thickness of 130 to 230 mm. Each of the cast slabs was hot-rolled under the specific conditions (the slab-heating temperature (SRT), the amount of time during which the surface temperature of the slab was 1220° C. or more (soaking time), and the finishing temperature (FT)) described in Table 2 (Tables 2-1 and 2-2 are collectively referred to as "Table 2"). Then, the steel sheets were cooled with an average cooling rate (cooling rate) of 30 to 200° C./s and subsequently coiled at the respective coiling temperatures (CT) shown in Table 2. The resulting hot-rolled steel sheets were pickled and then cold-rolled with the respective rolling reductions shown in Table 2 to form cold-rolled steel sheets having the thicknesses shown in Table 2. The unit of "[% Ti]×[% Nb]$^2$" shown in Table 1 is (mass %)$^3$.

Each of the cold-rolled steel sheets was annealed in a continuous annealing line under the specific conditions (the annealing temperature (AT) and the amount of time during which soaking was performed at 860° C. or more and 910° C. or less (holding time 1)) shown in Table 2. Then, each of the steel sheets was cooled such that the temperature was reduced from the annealing temperature to 420° C. at the specific average cooling rate (primary cooling rate) shown in Table 2 and the temperature was reduced from 420° C. to the cooling-stop temperature, that is, 280° C. or less, at the specific average cooling rate (secondary cooling rate) shown in Table 2. Each of the steel sheets was then tempered under the specific conditions shown in Table 2, that is, the cooling-stop temperature or the temperature (holding temperature 2) at which holding was performed subsequent to the optional reheating and the amount of time (holding time 2) during which holding was performed at the temperature which is shown in Table 2 (note that, No. 10 is an example where the steel sheet was directly cooled to 100° C. without holding; the amount of time it took to cool the steel sheet is shown in the column "Holding time"). In Examples, the temperature at which the cooling rate was reduced to be less than 10° C./s was considered to be a cooling-stop temperature. The steel sheets were subsequently temper-rolled at an elongation of 0.1% to form final steel sheets. The thicknesses of the final steel sheets were 0.5 to 2.6 mm.

As for Steel C, when the temperature was reduced to 420° C. subsequent to annealing, the steel sheet was immersed in a hot-dip galvanizing bath heated at 480° C. The galvanized steel sheet was subjected to an alloying treatment by being heated to 540° C. and then held for 15 seconds to form an alloyed hot-dip galvanized steel sheet.

TABLE 1

| Steel No. | C | Si | Mn | P | S | sol. Al | N | O | B | Nb | Ti | Cu | Ni | [%Nb] + [%Ti] | [%Ti] × [%Nb]² (×10⁻⁶) | others | Remark |
|---|---|---|---|---|---|---|---|---|---|---|---|---|---|---|---|---|---|
| A | 0.148 | 0.25 | 2.65 | 0.009 | 0.0005 | 0.030 | 0.0030 | 0.0011 | 0.0012 | 0.004 | 0.014 | 0 | 0 | 0.018 | 0.2 | — | Conforming steel |
| B | 0.172 | 1.45 | 2.42 | 0.004 | 0.0007 | 0.036 | 0.0028 | 0.0009 | 0.0018 | 0.012 | 0.016 | 0.15 | 0.04 | 0.028 | 2.3 | Mo: 0.14, Sb: 0.007 | Conforming steel |
| C | 0.180 | 0.95 | 3.15 | 0.003 | 0.0004 | 0.040 | 0.0029 | 0.0008 | 0.0019 | 0.015 | 0.010 | 0.12 | 0.04 | 0.025 | 2.3 | Mo: 0.07 | Conforming steel |
| D | 0.198 | 0.87 | 2.70 | 0.010 | 0.0003 | 0.045 | 0.0039 | 0.0008 | 0.0017 | 0.014 | 0.007 | 0.18 | 0.05 | 0.021 | 1.4 | — | Conforming steel |
| E | 0.259 | 1.02 | 2.50 | 0.005 | 0.0007 | 0.021 | 0.0014 | 0.0008 | 00019 | 0.008 | 0.006 | 0.14 | 0.03 | 0.014 | 0.4 | — | Conforming steel |
| F | 0.198 | 0.35 | 2.95 | 0.003 | 0.0008 | 0.045 | 0.0012 | 0.0012 | 0.0022 | 0.005 | 0.003 | 0.18 | 0.04 | 0.008 | 0.1 | Mo: 0.13 | Conforming steel |
| G | 0.192 | 0.25 | 2.65 | 0.007 | 0.0007 | 0.029 | 0.0032 | 0.0009 | 0.0012 | 0.027 | 0.010 | 0.18 | 0.04 | 0.037 | 7.3 | Ce: 0.0010, Mg: 0.0025 | Conforming steel |
| H | 0.205 | 0.10 | 2.45 | 0.010 | 0.0009 | 0.048 | 0.0022 | 0.0010 | 0.0017 | 0.010 | 0.017 | 0 | 0 | 0.027 | 1.7 | Ca: 0.0008 Mo: 0.07 | Conforming steel |
| I | 0.200 | 0.04 | 2.35 | 0.012 | 0.0007 | 0.012 | 0.0035 | 0.0008 | 0.0014 | 0.000 | 0.038 | 0.12 | 0.02 | 0.038 | 0.0 | Cr: 0.5, Sb: 0.006, La: 0.001 | Conforming steel |
| J | 0.205 | 0.30 | 2.80 | 0.008 | 0.0005 | 0.030 | 0.0041 | 0.0018 | 0.0013 | 0.008 | 0.002 | 0.38 | 0.14 | 0.010 | 0.1 | Zr: 0.03, Sn: 0.003 | Conforming steel |
| K | 0.205 | 0.45 | 1.90 | 0.009 | 0.0008 | 0.025 | 0.0037 | 0.0019 | 0.0008 | 0.005 | 0.004 | 0.21 | 0.08 | 0.009 | 0.1 | Ca: 0.0010, V: 0.25, W: 0.05, Cr: 0.2 | Conforming steel |
| L | 0.200 | 0.20 | 2.70 | 0.008 | 0.0018 | 0.045 | 0.0041 | 0.0011 | 0.0015 | 0.012 | 0.009 | 0.12 | 0.01 | 0.021 | 1.3 | — | Comparative steel |
| M | 0.198 | 0.50 | 2.80 | 0.007 | 0.0009 | 0.042 | 0.0040 | 0.0010 | 0.0010 | 0.002 | 0.002 | 0.15 | 0.05 | 0.004 | 0.0 | — | Comparative steel |
| N | 0.180 | 0.70 | 2.50 | 0.012 | 0.0008 | 0.015 | 0.0039 | 0.0010 | 0.0018 | 0.032 | 0.012 | 0.12 | 0.07 | 0.0440 | 12.3 | — | Comparative steel |
| O | 0.175 | 0.85 | 2.60 | 0.010 | 0.0008 | 0.011 | 0.0035 | 0.0010 | 0.0020 | 0 | 0.055 | 0.13 | 0.10 | 0.0550 | 0.0 | — | Comparative steel |
| P | 0.185 | 0.58 | 2.95 | 0.012 | 0.0009 | 0.015 | 0.0064 | 0.0010 | 0.0018 | 0.018 | 0.016 | 0.13 | 0.02 | 0.0340 | 5.2 | — | Comparative steel |
| Q | 0.193 | 0.45 | 2.78 | 0.006 | 0.0008 | 0.012 | 0.0042 | 0.0027 | 0.0014 | 0.015 | 0.020 | 0.14 | 0.04 | 0.0350 | 4.5 | — | Comparative steel |
| R | 0.202 | 0.32 | 1.40 | 0.007 | 0.0007 | 0.028 | 0.0040 | 0.0012 | 0.0012 | 0.009 | 0.015 | 0.18 | 0.01 | 0.0240 | 1.2 | — | Comparative steel |
| S | 0.12 | 0.40 | 2.45 | 0.007 | 0.0006 | 0.028 | 0.0040 | 0.0014 | 0.0012 | 0.000 | 0.050 | 0.18 | 0.35 | 0.0500 | 0.0 | — | Comparative steel |
| T | 0.201 | 0.32 | 2.35 | 0.012 | 0.0006 | 0.054 | 0.0042 | 0.0012 | 0.0039 | 0.000 | 0.034 | 0.20 | 0.05 | 0.0340 | 0.0 | — | Comparative steel |

TABLE 1-continued

| Steel No. | C | Si | Mn | P | S | sol. Al | N | O | B | Nb | Ti | Cu | Ni | [% Nb] + [% Ti] | [% Ti] × [% Nb] + [% Nb]² (×10⁻⁶) | others | Remark |
|---|---|---|---|---|---|---|---|---|---|---|---|---|---|---|---|---|---|
| U | 0.205 | 0.01 | 2.80 | 0.007 | 0.0008 | 0.028 | 0.0040 | 0.0008 | 0.0010 | 0.050 | 0 | 0.18 | 0.01 | 0.0500 | 0.0 | — | Comparative steel |
| V | 0.210 | 0.69 | 2.72 | 0.012 | 0.0005 | 0.018 | 0.0035 | 0.0010 | 0.0018 | 0.040 | 0.012 | 0.12 | 0.07 | 0.0520 | 19.2 | — | Comparative steel |
| W | 0.252 | 0.91 | 2.72 | 0.004 | 0.0004 | 0.021 | 0.0015 | 0.0008 | 0.0017 | 0.038 | 0.012 | 0.16 | 0.07 | 0.0500 | 17.3 | — | Comparative steel |

*The underlined values are outside the range of the disclosed embodiments
*In composition, the contents of the elements are in mass %

TABLE 2

| | | Hot rolling conditions | | | | Cold rolling conditions | | Annealing conditions | | | | | |
|---|---|---|---|---|---|---|---|---|---|---|---|---|---|
| | | | | | | | | | | Primary | Secondary | Cooling- | | |
| No. | Steel No. | SRC (°C.) | Soaking time (min) | FT (°C.) | CT (°C.) | Rolling reduction (%) | Thickness (mm) | AT (°C.) | Holding time 1 (s) | cooling rate (°C./s) | cooling rate (°C./s) | stop temperature (°C.) | Holding temperature 2 (°C.) | Holding time 2 (s) |
| 1 | A | 1250 | 120 | 880 | 490 | 65 | 0.7 | 880 | 300 | 15 | 25 | 180 | 180 | 120 |
| 2 | B | 1200 | 150 | 870 | 490 | 65 | 0.8 | 880 | 360 | 35 | 25 | 190 | 190 | 180 |
| 3 | | 1230 | 30 | 870 | 490 | 65 | 0.8 | 880 | 360 | 35 | 25 | 190 | 190 | 180 |
| 4 | | 1230 | 150 | 870 | 490 | 65 | 0.8 | 880 | 360 | 35 | 25 | 190 | 190 | 180 |
| 5 | | 1230 | 150 | 870 | 490 | 65 | 0.8 | 880 | 80 | 35 | 25 | 210 | 210 | 180 |
| 6 | | 1230 | 150 | 870 | 490 | 65 | 0.8 | 830 | 0 | 35 | 25 | 210 | 210 | 180 |
| 8 | | 1230 | 150 | 870 | 490 | 65 | 0.8 | 880 | 360 | 35 | 5 | 180 | 180 | 180 |
| 10 | C | 1250 | 120 | 880 | 500 | 56 | 1.4 | 890 | 540 | 3 | 20 | 100 | — | 8 |
| 11 | | 1250 | 120 | 880 | 500 | 56 | 1.4 | 890 | 540 | 3 | 20 | 200 | 200 | 25 |
| 12 | | 1250 | 120 | 880 | 500 | 56 | 1.4 | 890 | 360 | 3 | 25 | 20 | 180 | 10800 |
| 13 | | 1250 | 120 | 880 | 500 | 50 | 1.6 | 865 | 180 | 4 | 10 | 200 | 200 | 25 |
| 14 | | 1250 | 120 | 880 | 500 | 56 | 1.4 | 890 | 360 | 1.4 | 10 | 200 | 200 | 25 |
| 15 | | 1250 | 120 | 880 | 500 | 56 | 1.4 | 890 | 960 | 3 | 20 | 200 | 200 | 25 |
| 16 | | 1140 | 120 | 880 | 500 | 56 | 1.4 | 890 | 90 | 3 | 20 | 200 | 200 | 25 |
| 17 | D | 1270 | 120 | 880 | 530 | 53 | 1.4 | 880 | 310 | 20 | 1000 | 20 | 180 | 800 |
| 18 | | 1230 | 40 | 880 | 530 | 53 | 1.4 | 900 | 340 | 20 | 1000 | 20 | 180 | 800 |
| 19 | E | 1260 | 120 | 880 | 500 | 53 | 1.8 | 880 | 240 | 20 | 20 | 200 | 200 | 180 |
| 20 | F | 1250 | 120 | 910 | 540 | 53 | 1.8 | 900 | 390 | 20 | 25 | 200 | 200 | 180 |
| 21 | G | 1250 | 120 | 910 | 540 | 63 | 1.2 | 870 | 240 | 20 | 25 | 200 | 200 | 180 |
| 22 | H | 1230 | 170 | 890 | 500 | 56 | 1.4 | 865 | 150 | 40 | 30 | 170 | 240 | 200 |
| 23 | I | 1250 | 110 | 860 | 520 | 53 | 1.8 | 905 | 300 | 40 | 80 | 150 | 180 | 240 |
| 24 | J | 1240 | 180 | 890 | 500 | 56 | 1.4 | 905 | 180 | 20 | 20 | 200 | 200 | 150 |
| 25 | | 1230 | 80 | 850 | 500 | 56 | 1.4 | 885 | 180 | 20 | 20 | 200 | 200 | 150 |
| 26 | K | 1250 | 150 | 880 | 520 | 56 | 1.4 | 900 | 200 | 8 | 80 | 240 | 240 | 240 |
| 27 | L | 1250 | 150 | 870 | 520 | 56 | 1.4 | 890 | 300 | 20 | 25 | 200 | 200 | 180 |
| 28 | M | 1230 | 150 | 870 | 520 | 56 | 1.4 | 890 | 300 | 20 | 25 | 200 | 200 | 180 |
| 29 | N | 1230 | 180 | 870 | 520 | 64 | 1.0 | 880 | 300 | 30 | 25 | 200 | 200 | 180 |
| 30 | O | 1250 | 150 | 880 | 510 | 64 | 1.0 | 870 | 180 | 20 | 25 | 200 | 200 | 180 |
| 31 | P | 1250 | 180 | 880 | 510 | 56 | 1.4 | 880 | 240 | 20 | 25 | 200 | 200 | 180 |
| 32 | Q | 1230 | 150 | 860 | 520 | 56 | 1.4 | 865 | 150 | 20 | 25 | 190 | 190 | 180 |
| 33 | R | 1230 | 180 | 860 | 540 | 63 | 1.2 | 900 | 200 | 20 | 25 | 190 | 190 | 180 |
| 34 | S | 1270 | 150 | 880 | 550 | 63 | 1.2 | 865 | 160 | 20 | 25 | 200 | 200 | 180 |
| 35 | T | 1250 | 150 | 880 | 550 | 63 | 1.2 | 885 | 240 | 20 | 25 | 200 | 200 | 180 |
| 36 | U | 1250 | 180 | 870 | 520 | 63 | 1.2 | 890 | 240 | 20 | 25 | 200 | 200 | 180 |
| 37 | V | 1250 | 180 | 880 | 550 | 58 | 1.6 | 880 | 300 | 20 | 25 | 200 | 200 | 180 |
| 38 | W | 1250 | 150 | 890 | 560 | 58 | 1.6 | 880 | 300 | 20 | 25 | 200 | 200 | 180 |

TABLE 2-continued

| | Microstructure | | | | | | | Mechanical properties | | | Delayed fracture resistance | |
|---|---|---|---|---|---|---|---|---|---|---|---|---|
| | Area fraction of M + B (%) | Area fraction of balance (%) | Area fraction of B (%) | Number of inclusion clusters A (clusters/ mm²) | Number of inclusion clusters B (clusters/ mm²) | Number of carbide particles A (particles/ mm²) | Number of carbide particles B (×10⁷ particles/ mm²) | Average prior-γ grain size (μm) | YP (MPa) | TS (MPa) | El (%) | Delayed-fracture time (hr) | Remark |
| No. | | | | | | | | | | | | | |
| 1 | 100 | 0 | 7 | 0 | 1 | 1400 | 1.1 | 9 | 952 | 1350 | 7 | No fracture | Example |
| 2 | 99 | γ: 1 | 8 | 3 | 8 | 1600 | 1.4 | 9 | 1130 | 1512 | 9 | 4 | Comparative example |
| 3 | 99 | γ: 1 | 8 | 3 | 8 | 1200 | 1.4 | 9 | 1122 | 1515 | 9 | 10 | Comparative example |
| 4 | 99 | γ: 1 | 8 | 1 | 3 | 1400 | 1.5 | 9 | 1020 | 1515 | 9 | 60 | Example |
| 5 | 99 | γ: 1 | 10 | 1 | 3 | 7800 | 1.4 | 9 | 1125 | 1525 | 9 | 11 | Comparative example |
| 6 | 85 | F: 12, γ: 3 | 14 | 1 | 3 | 9500 | 0.2 | 5 | 1053 | 1511 | 11 | 8 | Comparative example |
| 8 | 86 | F: 10, γ: 4 | 27 | 1 | 3 | 1300 | 0.2 | 9 | 1040 | 1510 | 11 | 10 | Comparative example |
| 10 | 98 | γ: 2 | 9 | 0 | 5 | 200 | 0.2 | 12 | 1070 | 1515 | 10 | 30 | Example |
| 11 | 97 | γ: 3 | 11 | 0 | 5 | 200 | 1.0 | 12 | 1135 | 1500 | 10 | 100 | Example |
| 12 | 100 | 0 | 8 | 0 | 5 | 400 | 2.0 | 12 | 1270 | 1502 | 9 | No fracture | Example |
| 13 | 92 | F: 4, γ: 4 | 15 | 0 | 5 | 400 | 0.4 | 12 | 1007 | 1501 | 12 | 24 | Example |
| 14 | 83 | F: 12, γ: 5 | 17 | 0 | 5 | 200 | 0.2 | 11 | 980 | 1489 | 12 | 9 | Comparative example |
| 15 | 99 | γ: 1 | 5 | 0 | 5 | 0 | 1.0 | 17 | 1170 | 1490 | 9 | 20 | Comparative example |
| 16 | 96 | F: 3, γ: 1 | 11 | 3 | 12 | 5500 | 1.0 | 7 | 950 | 1485 | 9 | 4 | Comparative example |
| 17 | 100 | 0 | 1 | 0 | 5 | 1200 | 3.2 | 9 | 1301 | 1603 | 9 | 6 | Example |
| 18 | 100 | 0 | 1 | 3 | 10 | 0 | 3.2 | 13 | 1307 | 1605 | 9 | 1 | Comparative example |
| 19 | 99 | γ: 1 | 5 | 0 | 0 | 1400 | 1.3 | 12 | 1403 | 1783 | 8 | 1.5 | Example |
| 20 | 100 | 0 | 7 | 1 | 0 | 0 | 1.2 | 13 | 1142 | 1470 | 7 | No fracture | Example |
| 21 | 100 | 0 | 7 | 1 | 5 | 2400 | 1.5 | 8 | 1150 | 1508 | 8 | 26 | Example |
| 22 | 100 | 0 | 4 | 1 | 2 | 3500 | 1.5 | 8 | 1160 | 1482 | 9 | No fracture | Example |
| 23 | 100 | 0 | 3 | 1 | 5 | 0 | 2.5 | 8 | 1130 | 1517 | 11 | 28 | Example |
| 24 | 100 | 0 | 6 | 0 | 5 | 0 | 1.0 | 14 | 1160 | 1509 | 10 | No fracture | Example |
| 25 | 95 | F: 5 | 6 | 3 | 8 | 600 | 1.0 | 12 | 1050 | 1523 | 10 | 10 | Comparative example |
| 26 | 100 | 0 | 2 | 1 | 5 | 100 | 0.5 | 14 | 1132 | 1522 | 9 | 40 | Example |
| 27 | 100 | 0 | 6 | 4 | 7 | 400 | 1.0 | 11 | 1158 | 1505 | 8 | 2 | Comparative example |
| 28 | 100 | 0 | 6 | 1 | 0 | 400 | 1.0 | 16 | 1120 | 1501 | 9 | 8 | Comparative example |
| 29 | 99 | γ: 1 | 7 | 1 | 14 | 1200 | 0.9 | 9 | 1140 | 1504 | 7 | 6 | Comparative example |
| 30 | 99 | γ: 1 | 6 | 1 | 14 | 1600 | 0.8 | 5 | 1142 | 1514 | 7 | 10 | Comparative example |
| 31 | 100 | 0 | 6 | 1 | 13 | 1800 | 0.9 | 10 | 1138 | 1506 | 5 | 11 | Comparative example |
| 32 | 96 | F: 4 | 6 | 1 | 8 | 0 | 0.7 | 7 | 1155 | 1525 | 6 | 10 | Comparative example |
| 33 | 60 | F: 40 | 15 | 1 | 6 | 300 | 1.4 | 12 | 680 | 1150 | 14 | 5 | Comparative example |
| 34 | 100 | 0 | 12 | 0 | 11 | 2200 | 0.8 | 5 | 802 | 1266 | 7 | No fracture | Comparative example |
| 35 | 100 | 0 | 7 | 1 | 5 | 8400 | 1.0 | 10 | 1133 | 1507 | 7 | 10 | Comparative example |
| 36 | 100 | 0 | 6 | 1 | 10 | 300 | 1.0 | 12 | 1180 | 1509 | 6 | 8 | Comparative example |
| 37 | 100 | 0 | 6 | 1 | 12 | 1400 | 1.1 | 8 | 1250 | 1612 | 8 | 1 | Comparative example |

TABLE 2-continued

| | | | | | | | | | | | | | |
|---|---|---|---|---|---|---|---|---|---|---|---|---|---|
| 38 | 100 | 0 | 7 | 0 | <u>10</u> | 1400 | 1.2 | 8 | 1395 | 1775 | 8 | <u>0.2</u> | Comparative example |

*The underlined values are outside the range of the disclosed embodiments
M: Martensite,
B: Bainite,
F: Ferrite,
γ: Retained γ

The microstructure of each of the steel sheets was analyzed and determined by the above-described methods.

The steel sheets were also evaluated in terms of 1) tensile test and 2) delayed fracture resistance in the following manner.

Table 2 also summarizes the results.

1) Tensile Test

In the tensile test, a JIS No. 5 tensile test piece was taken from each of the coils at the position ¼ the width of the coil from an edge of the coil in the width direction such that the direction perpendicular to the rolling direction was equal to the longitudinal direction of the test piece, the test piece was subjected to a tensile test conforming to JIS 22241, and the yield strength (YP), the tensile strength (TS), and the elongation (El) of the test piece were measured.

2) Evaluation of Delayed Fracture Resistance

The evaluation of delayed fracture resistance was made in the following manner. Specifically, a strip-like specimen was taken from each of the steel sheets (coils) at the position ¼ the width of the coil from an edge of the coil in the width direction such that the length of the specimen was 100 mm in the direction perpendicular to the rolling direction and 30 mm in the rolling direction. The longer-side surfaces of the specimen which had a length of 100 mm were formed by shearing. The specimen was subjected to a bending work directly subsequent to shearing (without being machined to remove burrs) such that the burrs faced the outer peripheral surface of the bent specimen. In the shearing work, the clearance was set to 13% and the rake angle was set to 2 degrees. The bending work was done with a bend radius that satisfied R/t=4.0, where R represents the bend radius and t represents the thickness of the steel sheet (e.g., when the thickness of the steel sheet is 2.0 mm, the bending work is done with a punch having a tip radius of 8.0 mm) such that the inside angle of the bending was 90 degrees (V-bend). The punch used was a U-shaped punch having a tip with the above radius (a punch including a semicircular tip R and a body having a thickness of 2R). The die used had a corner with an R of 30 mm. The steel sheet was formed into shape such that the angle of the bending was 90 degrees (V-shape) by adjusting the depth the punch was pressed against the steel sheet. The specimen was pinched and tightly fixed (such that the distance between the flanged ends of the specimen was equal to that of the specimen that was most pressed by the punch in the bending work) using a hydraulic jack such that the specimen was maintained in the same shape as in the bending work (such that an increase in the gap between the straight portions of the specimen due to springback was cancelled out) and then fixed by bolts. The bolts used for fixing the specimen were attached to the specimen before use so as to penetrate through oval holes (minor axis: 10 mm, major axis: 15 mm) formed in the strip-like specimen at positions 10 mm from the respective short-side edges. The specimen fixed with the bolts was immersed in a 1 liter or more per specimen of hydrochloric acid (aqueous hydrogen chloride solution) having a pH of 1. While the temperature of the aqueous solution was set to 20° C. and the pH of the aqueous solution was controlled to be constant, evaluation of delayed fracture resistance was made. The presence of microcracks (initial state of delayed fracture) that were visually identifiable (having a length of about 1 mm) was determined visually or using a camera. The amount of time that elapsed from the start of the immersion of the specimen until the formation of microcracks was measured as the delayed-fracture time. The specimen was evaluated as "no fracture" when the formation of microcracks was not confirmed even after a lapse of 200 hours since the start of immersion of the specimen. In the case of a coated steel sheet, a sheet having a length of 300 mm in the rolling direction and a length of 300 mm in the direction perpendicular to the rolling direction was taken from the steel sheet, the Zn layer deposited on the surface was removed by dissolution with diluted hydrochloric acid, the sheet was subsequently stored at room temperature for one day (dehydrogenation treatment), and a specimen was taken from the sheet and prepared as in the above process, which was used for the evaluation of delayed fracture.

It was considered that a steel sheet had excellent delayed fracture resistance when the steel sheet was evaluated as "No fracture" in the case where the steel sheet had a TS of 1320 MPa or more and less than 1500 MPa; when the delayed-fracture time of the steel sheet was 24 hr or more in the case where the steel sheet had a TS of 1500 MPa or more and less than 1550 MPa; when the delayed-fracture time of the steel sheet was 6 hr or more in the case where the steel sheet had a TS of 1550 MPa or more and less than 1670 MPa; and when the delayed-fracture time of the steel sheet was 1.0 hr or more in the case where the steel sheet had a TS of 1670 MPa or more.

The results shown in Table 2 confirm that all of the steel sheets prepared in examples according to the disclosed embodiments had a high tensile strength (TS) of 1320 MPa or more and excellent delayed fracture resistance.

In contrast, the steel sheets prepared in Comparative examples did not have a sufficiently high strength or sufficiently high delayed fracture resistance.

There was no clear relationship between the number density of the inclusion clusters and the improvement in delayed fracture resistance in the case where inclusion particles having a major axis of less than 0.3 μm were also included in particles constituting inclusion clusters A or inclusion clusters B; in the case where inclusion particles such that the minimum distance between the inclusion particles was more than 30 μm were also included in particles constituting inclusion clusters A; and in the case where inclusion particles such that the minimum distance between the inclusion particles was more than 10 μm were also included in particles constituting inclusion clusters B.

The invention claimed is:

1. A steel sheet having a chemical composition comprising, by mass %:
C: 0.13% to 0.40%,
Si: 1.5% or less,
Mn: 1.8% to 4%, P: 0.02% or less,
S: less than 0.0010%,
sol. Al: 0.2% or less,
N: less than 0.0060%,
B: 0.0003% or more and less than 0.0035%, and
O: less than 0.0020%,
at least one of Nb: 0.002% or more and less than 0.035%, and Ti: 0.002% or more and less than 0.040%, and
the balance being Fe and inevitable impurities,
wherein the steel sheet has a microstructure including (i) martensite and bainite, a total area fraction of the martensite and the bainite to an entirety of the microstructure being in a range of more than 90% and 100% or less, (ii) prior-γ grains having an average grain size of 6 to 15 μm, (iii) inclusion clusters A having a major axis of 100 μm or more, each of the inclusion clusters A being constituted by one or more inclusion particles, the inclusion particles having a major axis of 0.3 μm or more, and, in the case where the inclusion clusters are constituted by two or more inclusion particles, a shortest distance between the inclusion particles is 30 μm or less, and inclusion clusters B having a major axis of 20 μm or more and less than 100 μm, each of the inclusion clusters B being constituted by one or more inclusion particles, the inclusion particles having a major axis of 0.3 μm or more, and, in the case where the inclusion clusters are constituted by two or more inclusion particles, a shortest distance between the inclusion particles is 10 μm or less, the content of the inclusion clusters A in the microstructure being 2 clusters/mm$^2$ or less, and the content of the inclusion clusters B in the microstructure being 5 clusters/mm$^2$ or less, and (iv) carbide particles including Fe as a main constituent, the Fe as the main constituent including Fe—C carbides and a proportion of Fe to elements other than C is 50 at % or more, the carbide particles having an aspect ratio of 2.0 or less and a major axis of 0.30 μm or more and 2 μm or less, and the content of the carbide particles in the microstructure being 4000 particles/mm$^2$ or less,
Formula (1) and Formula (2) are both satisfied:

$$[\% Ti]+[\% Nb]>0.007 \quad (1)$$

$$[\% Ti]\times[\% Nb]^2<7.5\times10^{-6} \quad (2)$$

where [% Nb] and [% Ti] represent the contents (mass %) of Nb and Ti, respectively, and
the steel sheet has a thickness of 0.5 to 2.6 mm and a tensile strength of 1320 MPa or more.

2. The steel sheet according to claim 1, wherein carbide particles having a diameter of 10 to 200 nm are dispersed inside at least one of the martensite and the bainite, the content of the carbide particles in the at least one of the martensite and the bainite being $0.3\times10^7$ particles/mm$^2$ or more.

3. The steel sheet according to claim 2, wherein the microstructure includes retained γ, and the area fraction of the retained γ to the entirety of the microstructure is less than 5%.

4. The steel sheet according to claim 3, wherein the steel sheet has a coating layer deposited on the surface thereof.

5. The steel sheet according to claim 2, wherein the steel sheet has a coating layer deposited on the surface thereof.

6. The steel sheet according to claim 1, wherein the microstructure includes retained γ, and the area fraction of the retained γ to the entirety of the microstructure is less than 5%.

7. The steel sheet according to claim 6, wherein the steel sheet has a coating layer deposited on the surface thereof.

8. The steel sheet according to claim 1, the chemical composition further comprising, by mass %, at least one group selected from Groups A-D:
Group A: at least one of Cu: 0.005% to 1%, and Ni: 0.01% to 1%,
Group B: at least one element selected from the group consisting of:
Cr: 0.01% to 1.0%,
Mo: 0.01% to 0.5%,
V: 0.003% to 0.5%,
Zr: 0.005% to 0.2%, and
W: 0.005% to 0.2%,
Group C: at least one element selected from the group consisting of:
Ca: 0.0002% to 0.0030%,
Ce: 0.0002% to 0.0030%,
La: 0.0002% to 0.0030%, and
Mg: 0.0002% to 0.0030%, and
Group D: at least one of Sb: 0.002% to 0.1%, and Sn: 0.002% to 0.1%.

9. The steel sheet according to claim 8, wherein carbide particles having a diameter of 10 to 200 nm are dispersed inside at least one of the martensite and the bainite, the content of the carbide particles in the at least one of the martensite and the bainite being $0.3\times10^7$ particles/mm$^2$ or more.

10. The steel sheet according to claim 9, wherein the microstructure includes retained γ, and the area fraction of the retained γ to the entirety of the microstructure is less than 5%.

11. The steel sheet according to claim 10, wherein the steel sheet has a coating layer deposited on the surface thereof.

12. The steel sheet according to claim 9, wherein the steel sheet has a coating layer deposited on the surface thereof.

13. The steel sheet according to claim 8, wherein the microstructure includes retained γ, and the area fraction of the retained γ to the entirety of the microstructure is less than 5%.

14. The steel sheet according to claim 13, wherein the steel sheet has a coating layer deposited on the surface thereof.

15. The steel sheet according to claim 8, wherein the steel sheet has a coating layer deposited on the surface thereof.

16. The steel sheet according to claim 1, wherein the steel sheet has a coating layer deposited on the surface thereof.

17. A method for producing the steel sheet according to claim 1, the method comprising:
soaking a steel slab having the chemical composition for 100 minutes or more with a slab-heating temperature higher than 1220° C. and subsequently hot-rolling the steel slab into a hot-rolled steel sheet;
cold-rolling the hot-rolled steel sheet into a cold-rolled steel sheet at a rolling reduction in a range of 20% to 75% such that the cold-rolled steel sheet has a thickness of 0.5 to 2.6 mm; and
performing annealing of the cold-rolled steel sheet, the annealing including soaking the cold-rolled steel sheet for in a range of 150 to 600 seconds at an annealing temperature in a range of 860° C. or more and 910° C. or less, subsequently cooling from the annealing temperature to 420° C. at an average cooling rate of 2° C./s or more, and further cooling from 420° C. to 280° C. or less at an average cooling rate of 10° C./s or more.

18. The method for producing the steel sheet according to claim 17, wherein, in the annealing, subsequent to the cooling to 280° C. or less, optionally reheating, holding at a temperature in a range of 120° C. to 280° C. for in a range of 15 seconds to 3 days, and subsequently cooling to a room temperature.

19. The method for producing the steel sheet according to claim 18, wherein, during cooling from the annealing temperature to 420° C. at an average cooling rate of 2° C./s or more in the annealing, the steel sheet is immersed in a plating bath in order to perform coating of the steel sheet.

20. The method for producing the steel sheet according to claim 19, wherein, after the steel sheet has been immersed in the plating bath in order to perform the coating, the steel sheet is heated to a temperature in a range of 480° C. to 600° C. in order to perform alloying.

21. The method for producing the steel sheet according to claim 17, wherein, during cooling from the annealing temperature to 420° C. at an average cooling rate of 2° C./s or more in the annealing, the steel sheet is immersed in a plating bath in order to perform coating of the steel sheet.

22. The method for producing the steel sheet according to claim 21, wherein, after the steel sheet has been immersed in the plating bath in order to perform the coating, the steel sheet is heated to a temperature in a range of 480° C. to 600° C. in order to perform alloying.

23. A method for producing the steel sheet according to claim 8, the method comprising:
    soaking a steel slab having the chemical composition for 100 minutes or more with a slab-heating temperature higher than 1220° C. and subsequently hot-rolling the steel slab into a hot-rolled steel sheet;
    cold-rolling the hot-rolled steel sheet into a cold-rolled steel sheet at a rolling reduction in a range of 20% to 75% such that the cold-rolled steel sheet has a thickness of 0.5 to 2.6 mm; and
    performing annealing of the cold-rolled steel sheet, the annealing including soaking the cold-rolled steel sheet for in a range of 150 to 600 seconds at an annealing temperature in a range of 860° C. or more and 910° C. or less, subsequently cooling from the annealing temperature to 420° C. at an average cooling rate of 2° C./s or more, and further cooling from 420° C. to 280° C. or less at an average cooling rate of 10° C./s or more.

24. The method for producing the steel sheet according to claim 23, wherein, in the annealing, subsequent to the cooling to 280° C. or less, optionally reheating, holding at a temperature in a range of 120° C. to 280° C. for in a range of 15 seconds to 3 days, and subsequently cooling to a room temperature.

25. The method for producing the steel sheet according to claim 24, wherein, during cooling from the annealing temperature to 420° C. at an average cooling rate of 2° C./s or more in the annealing, the steel sheet is immersed in a plating bath in order to perform coating of the steel sheet.

26. The method for producing the steel sheet according to claim 25, wherein, after the steel sheet has been immersed in the plating bath in order to perform the coating, the steel sheet is heated to a temperature in a range of 480° C. to 600° C. in order to perform alloying.

27. The method for producing the steel sheet according to claim 23, wherein, during cooling from the annealing temperature to 420° C. at an average cooling rate of 2° C./s or more in the annealing, the steel sheet is immersed in a plating bath in order to perform coating of the steel sheet.

28. The method for producing the steel sheet according to claim 27, wherein, after the steel sheet has been immersed in the plating bath in order to perform the coating, the steel sheet is heated to a temperature in a range of 480° C. to 600° C. in order to perform alloying.

* * * * *